(12) United States Patent
Ballard et al.

(10) Patent No.: US 7,263,662 B1
(45) Date of Patent: *Aug. 28, 2007

(54) CUSTOMIZATION OF IMMEDIATE ACCESS AND HOTKEY FUNCTIONALITY IN AN INTERNET APPLICATION USER INTERFACE

(75) Inventors: Alan Ballard, Vancouver (CA); John Schroeder, Plesanton, CA (US); Peggy Shafer, Pleasanton, CA (US); Theresa Sherwood, Walnut Creek, CA (US)

(73) Assignee: Oracle International Corporation, Redwood Shores, CA (US)

( * ) Notice: Subject to any disclaimer, the term of this patent is extended or adjusted under 35 U.S.C. 154(b) by 659 days.

This patent is subject to a terminal disclaimer.

(21) Appl. No.: 10/035,413

(22) Filed: Dec. 28, 2001

Related U.S. Application Data

(60) Provisional application No. 60/316,773, filed on Aug. 31, 2001, provisional application No. 60/273,190, filed on Mar. 2, 2001.

(51) Int. Cl.
G06F 3/00 (2006.01)
(52) U.S. Cl. ............... 715/762; 715/505; 715/765; 715/802; 715/523; 715/760; 707/102
(58) Field of Classification Search ............... 715/827, 715/762, 744, 866, 825; 707/102, 2
See application file for complete search history.

(56) References Cited

U.S. PATENT DOCUMENTS

| 5,371,847 A | 12/1994 | Hargrove |
| 5,385,088 A | 1/1995 | Grabscheid |
| 5,525,978 A * | 6/1996 | York et al. ............... 341/22 |
| 5,625,763 A | 4/1997 | Cirne |
| 5,625,783 A * | 4/1997 | Ezekiel et al. ............ 719/320 |
| 5,721,850 A * | 2/1998 | Farry et al. .............. 715/700 |
| 5,832,481 A | 11/1998 | Sheffield |
| 5,845,303 A | 12/1998 | Templeman |
| 5,916,310 A * | 6/1999 | McCain .................. 710/67 |
| 5,973,688 A * | 10/1999 | May ..................... 715/709 |
| 6,005,568 A | 12/1999 | Simonoff et al. |
| 6,014,638 A | 1/2000 | Burge et al. |
| 6,026,433 A | 2/2000 | D'Arlach et al. |
| 6,067,552 A | 5/2000 | Yu |
| 6,134,549 A * | 10/2000 | Regnier et al. ............ 707/9 |
| 6,181,344 B1 * | 1/2001 | Tarpenning et al. ....... 715/863 |

(Continued)

OTHER PUBLICATIONS

Forms in HTML documents, Nov. 15, 2000, http://www.w3.org/TR/WD-html40-970708/interact/forms.html, pp. 1-8, □□.*

(Continued)

*Primary Examiner*—Kristine Kincaid
*Assistant Examiner*—Ryan Pitaro
(74) *Attorney, Agent, or Firm*—Townsend & Townsend & Crew LLP

(57) ABSTRACT

The present invention includes systems and methods for customization of internet applications. Multiple levels of customization are applied to both static and functional aspects of user interface elements including, for example, tab-order, tab-over, immediate access keys, and hotkeys. Customization is also achieved with respect to searching over multiple user interfaces, presentation of information on a user interface, and the interaction model used by the internet application. Customization is enabled on any client supporting standard browser functionality.

62 Claims, 25 Drawing Sheets

U.S. PATENT DOCUMENTS

| | | | |
|---|---|---|---|
| 6,249,284 | B1 | 6/2001 | Bogdan |
| 6,266,675 | B1 * | 7/2001 | Evans et al. ............. 707/104.1 |
| 6,317,143 | B1 * | 11/2001 | Wugofski ................... 715/765 |
| 6,327,628 | B1 * | 12/2001 | Anuff et al. ................ 719/311 |
| 6,362,838 | B1 | 3/2002 | Szlam et al. |
| 6,483,523 | B1 * | 11/2002 | Feng .......................... 715/745 |
| 6,549,199 | B1 | 4/2003 | Carter et al. |
| 6,631,496 | B1 | 10/2003 | Li et al. |
| 6,934,697 | B1 * | 8/2005 | Warren .......................... 707/1 |
| 2001/0052910 | A1 | 12/2001 | Parekh et al. |
| 2002/0057298 | A1 * | 5/2002 | Wassom et al. ............. 345/825 |
| 2002/0097264 | A1 | 7/2002 | Dutta et al. |
| 2002/0199190 | A1 | 12/2002 | Su |
| 2004/0034833 | A1 * | 2/2004 | Kougiouris et al. ........ 715/513 |
| 2005/0114229 | A1 * | 5/2005 | Ackley et al. ................ 705/26 |

OTHER PUBLICATIONS

Oracle, Keyboard Shortcuts, pp. 1-11, Jun. 23, 2000. http://www.oracle.com/technology/tech/blaf/specs/keyboard.html.*

"Using PeopleSoft 7.5 Applications", PeopleSoft 7.5 May 1998, Published by Peoplesoft Inc. Pleasanton, CA.

U.S. Appl. No. 10/040,397, Alan Ballard, Customization of Tab-Order Functionality in Internet Applications, Dec. 28, 2001.

Alan Ballard, System and Method for Automatic Generation of HTML Based Interfaces Including Alternative Layout Modes, Jun. 7, 2002.

U.S. Appl. No. 10/040,396, Theresa Sherwood, System and Method for Searching Data Partially Displayed on a User Interface, Dec. 28, 2001.

U.S. Appl. No. 10/041,015, Alan Ballard, Customization of User Interface Presentation in an Internet Application User Interface, Dec. 28, 2001.

U.S. Appl. No. 10/041,034, Peter Gassner, Customization of Client-Server Interaction in an Internet Application, Dec. 28, 2001.

ResQNet.com, "ResQNet.com Announces the Release of ResQ!Net Version 3.2"; Jan. 26, 2001, www.resqnet.com/News/GeneralBar/V32.htm, p. 1-3.

IBM, "Accelerator Definitions", Jan. 1992, IBM Technical Disclosure Bulletin, vol. 34, No. 8, p. 118-120.

Castro, Elizabeth; HTML 4 for the World Wide Web Fourth Edition: Visual Quickstart Guide, Oct. 20, 1999, Peachpit Press, Introduction Chapter 7, Chapter 16.

Cuenca, Pedro; "Experiences in the use of metadata for web publishing", 1999, pp. 1-2.

"Advanced Basics: Visual Studio .NET: Setting Tab Order, Loading the Toolbox with an. . . "; http://msdn.microsoft.com/msdnmag/issues/02/03/Basics/Basics0203.asp,printed Jun. 14, 2002.

"Macromedia-How is the tab order for form fields in the flash player determined?"; http://www.macromedia.com/support/flash/Is/documents/tab_order.htm, printed Jun. 14, 2002.

"Introduction: WAI Web Content Accessibility Curriculum-Slide list"; http://www.w3.org/WAI/wcag-curric/overinl.htm, printed Jun. 14, 2002.

Guidelines: WAI Web Content Accessibility Curriculum-Slide "Introduction to the Guideline Set"; http://www.w3.ort/WAI/wcag-curric/grid1-0.htm, printed Jun. 14, 2002.

Checkpoints: WAI Web Content Accessibility Curriculum-Slide "Introduction to the checkpoint Set"; http://www.w3.ort/WAI/wcag-curric/chk1-0.htm, printed Jun. 14, 2002.

Examples: WAI Web Content Accessibility Curriculum-Slide "Introduction to the Example Set"; http://www.w3.ort/WAI/wcag-curric/sam1-0.htm, printed Jun. 14, 2002.

* cited by examiner

FIG. 13B

Address Detail

*Effective Date: 07/25/2001  — 1310, 1360, 1320

*Address Type: Business

Description:

*Status:

*Address ID:

Country: USA 🔍 United States  — 1350

Address 1: Peoplesoft Parkway

| Menu Name | Edit Components | | |
|---|---|---|---|
| ADMINISTER_SECURITY | Edit Components | + | − |
| APPLICATION_ENGINE | Edit Components | + | − |
| APPMSGMONITOR | Edit Components | + | − |
| CALLCENTER | Edit Components | + | − |
| CIC_PAGELETS | Edit Components | + | − |
| CNV_SCHEMA_MAP | Edit Components | + | − |
| CRM_OPEN_WORKLIST | Edit Components | + | − |
| CRM_PORTAL_COMPONENTS | Edit Components | + | − |
| CRM_TRANSFORM_UTILITY | Edit Components | + | − |
| CTI_CONFIGURATION | Edit Components | + | − |
| CUBE_MANAGER | Edit Components | + | − |
| EDI_MANAGER | Edit Components | + | − |
| ESTABLISH_BUSINESS_UNITS | Edit Components | + | − |
| MAINTAIN_PRODUCT_CONFIGURATOR | Edit Components | + | − |
| MAINTAIN_SECURITY | Edit Components | + | − |
| MAINTAIN_SOLUTION | Edit Components | + | − |
| MANAGE_INTEGRATION_RULES | Edit Components | + | − |
| MASS_CHANGE | Edit Components | + | − |
| NVISION | Edit Components | + | − |
| PORTAL_ADMIN | Edit Components | + | − |
| PORTAL_COMPONENTS | Edit Components | + | − |
| PORTAL_PERS_HOMEPAGE | Edit Components | + | − |
| PROCESSMONITOR | Edit Components | + | − |
| PROCESS_SCHEDULER | Edit Components | + | − |
| QUERY_MANAGER | Edit Components | + | − |
| RA_CAMPAIGN_MANAGEMENT | Edit Components | + | − |
| RA_CM_STRUCTURE | Edit Components | + | − |
| RB_DEFINE_PRODUCTS | Edit Components | + | − |
| RB_GENERAL_OPTIONS | Edit Components | + | − |
| RB_INTEGRATION_OPTIONS | Edit Components | + | − |
| RB_MANAGE_COMPETENCIES | Edit Components | + | − |
| RB_MANAGE_CUSTOMER_INFORMATION | Edit Components | + | − |
| RB_MANAGE_WORKFORCE | Edit Components | + | − |
| RB_PROCESS_INBOUND_TRANS | Edit Components | + | − |
| RB_STRUCTURE_SEARCHING | Edit Components | + | − |
| RB_WORKER_CALENDAR | Edit Components | + | − |
| RC_SELF_SERVICE | Edit Components | + | − |
| RC_SOLN_MGMT | Edit Components | + | − |
| REPORT_BOOKS | Edit Components | + | − |
| REPORT_MANAGER | Edit Components | + | − |
| RF_AGREEMENTS | Edit Components | + | − |
| RF_DEFINE_ITEMS | Edit Components | + | − |
| RF_DEFINE_ITEM_CONTROLS | Edit Components | + | − |
| RF_MAINT_ENTITLEMENTS | Edit Components | + | − |
| RF_MANAGE_RMA | Edit Components | + | − |
| RF_SERVICE_ORDER | Edit Components | + | − |
| RF_STRUCTURE | Edit Components | + | − |
| RI_CIC_HOME | Edit Components | + | − |
| RI_INTERACTION | Edit Components | + | − |
| RI_SETUP | Edit Components | + | − |
| RM_DELTA_UTILITY | Edit Components | + | − |
| RSF_FORECAST | Edit Components | + | − |
| RSF_LEADS | Edit Components | + | − |
| RSF_OPPORTUNITY | Edit Components | + | − |
| RSF_PRTL | Edit Components | + | − |
| RSF_SETUP_TABLES | Edit Components | + | − |
| RSF_TERRITORY | Edit Components | + | − |
| STRUCTURE_PROCESS_AUTOMATION | Edit Components | + | − |
| STRUCTURE_RC | Edit Components | + | − |
| TRANSLATE | Edit Components | + | − |
| EDI_MANAGER | Edit Components | + | − |
| TREE_MANAGER | Edit Components | + | − |
| UTILITIES | Edit Components | + | − |
| WORKFLOW_ADMINISTRATOR | Edit Components | + | − |
| WORKLIST | Edit Components | + | − |

FIG. 17B

CUSTOMIZATION OF IMMEDIATE ACCESS AND HOTKEY FUNCTIONALITY IN AN INTERNET APPLICATION USER INTERFACE

CROSS-REFERENCE TO RELATED APPLICATIONS

This application claims priority from commonly owned U.S. Provisional Patent Application No. 60/273,190 entitled "HTML—Based Applications for Support of Complex Transactions," filed Mar. 2, 2001 and U.S. Provisional Application No. 60/316,773 entitled "Meta Language Control of Complex Network Applications," filed Aug. 31, 2001.

This application is related to co-pending U.S. patent application Ser. No. 10/040,397, entitled "Customization of Tab-order Functionality in Internet Applications," co-pending U.S. patent application Ser. No. 10/041,034, entitled "Customization of Client-Server Interaction in an Internet Application," co-pending U.S. patent application Ser. No. 10/041,015, entitled "Customization of User Interface Presentation in an Internet Application User Interface," co-pending U.S. patent application Ser. No. 10/165,623, entitled "System and Method for Automatic Generation of HTML Based Interfaces Including Alternative Layout Modes," and co-pending U.S. patent application Ser. No. 10/040,396, entitled "System and Method for Searching Data Partially Displayed on a User Interface."

STATEMENT REGARDING FEDERALLY SPONSORED RESEARCH OR DEVELOPMENT

Not Applicable

BACKGROUND

1. Field of the Invention

The invention is in the field of application program development and specifically in the field of development and customization of internet applications.

2. Description of the Prior Art

In current internet design practice the elements, layout, and functionality of user interfaces and associated web pages are intended for casual users. These users typically access applications on an irregular basis and therefore prefer a simple and intuitive interface over more powerful alternatives. This preference has lead to the near universal adoption of a basic point and click interaction model in which navigation and control is accomplished by selecting user interface elements with a pointing device such as a mouse. Current design practice is also limited by outdated conceptions related to bandwidth limitations and portability. The point and click interaction model became dominate during a period of more limited bandwidth than is currently available. Similarly, the range of devices used to access user interfaces has grown significantly. Further, many of the new devices have limited memory and processing power.

Current internet design practice and the associated philosophy are detrimental to the development and use of enterprise application programs in an internet setting. These programs are typically used by consistent users who interact with the application on a regular basis and prefer an interface optimized for the most efficient interaction. Consistent users, therefore, desire features and capabilities beyond those encompassed by current internet design practice. For example, application programs designed for use on a standalone computer typically depend on a keyboard based interaction model. In contrast with the mouse based point and click model favored on the internet, the keyboard based, interaction model primarily depends on keystrokes entered by a user to communicate to the application. Utilizing keystrokes can be more efficient than the basic point and click interaction model. For instance, in data entry applications, where a user prefers to keep his or her hands located on the keys, having to reach for and manipulate a mouse is often a significant source of distraction and delay.

A desire to accommodate the greatest number of users has focused current internet design practice towards satisfying casual and/or novice users instead of consistent users. The resulting designs are intuitively simple to use but less powerful or efficient than they would be if customized for each enterprise or personalized for each individual user. Unfortunately, in the prior art, the ability to customize an internet based application is severely limited.

Current customization capabilities are generally a function of application architecture. The available architectures include standalone, client/server, and internet configurations. Standalone applications are the simplest, having just one user operating on one computing device. Standalone applications also typically have full access to the computing device for the purposes of storing and accessing configuration data. Client/server applications include both a client and a server. The application is primarily based on a server system but also relies on client system resources such as processing, memory, and data storage. In order to access these resources some part of the application resides on the client. Customization of client/server applications depends on these resources and may also require additional communications between the server and the client.

In contrast to the client/server architecture, pure internet applications use a standard web browser or browser compatible device as their client, and are generally referred to as thin or small client footprint applications. The internet application architecture provides an advantage in that no application code, other than the browser, need be installed or maintained on the client. Internet applications using standard internet protocols and security mechanisms do not require specialized client side code specific to the internet application and place essentially all the processing-intensive activities on an internet server.

Customization of internet applications that depend on a browser or browser compatible thin client is limited in the prior art to selection and layout of predefined elements on a user interface. These predefined elements include buttons, links, fields, forms, graphics, text, and other distinct parts of a user interface or associated web page. For example, some websites allow a user to design a "personal" web page or choose which news stories should appear on a page and how they should be arranged. Beyond appearance and location of custom text, URLs, or graphics, these websites do not allow customization of the predefined elements themselves. Thus, there are no means available by which a user can customize the functional properties of a user interface element.

Functional properties of a user interface element include operations beyond basic point and click navigation and retrieval of further content using a URL. These properties are important to consistent users. For example, they determine the interaction model between the user and any underlying applications. Customizing and personalizing functionality is, therefore, important to meeting the needs of consistent users. The inability to fully customize or personalize internet applications is a limitation of current design practice and has discouraged the implementation of enterprise application programs as internet applications.

Traditional client/server applications have included customization of elements within the application user interface. However, this customization of element functionality requires additional installed or built-in client-side code (e.g., Java® code, ActiveX®, etc.) on the client system. With the inclusion and execution of this client-side code the application is not a purely HTML based internet application. In addition to issues such as download security, licensing requirements, support, and compatibility, client-side code is disadvantageous because it is dependent on the client environment. This environment includes critical factors and limitations such as available memory, underlying operating system type (Windows®, UNIX, etc.), and operating system features. Client-side code also reduces portability because its execution may require computing power beyond what is available in some internet access devices. The amount of required client-side code and computing power required for a client/server application increases with the size and functionality of the application.

The client/server architecture has also been used to internet enable non-web based applications. In this process a client-side interface is used to access Windows®, UNIX, or Linux applications that are executed on a server. The client-side interface is either a custom application or a browser to which proprietary extensions have been added. The interface functions as a remote terminal accessing a pre-existing application. Interaction between the interface and the server-side application is controlled by computer code (i.e. ActiveX or Java code) downloaded or otherwise installed on the client. This client-side computer code is subject to the disadvantages of the traditional client/server architecture, such as dependence on the client side environment, etc.

Conventional standalone or "client side" applications are executed on a single computer with full access to the resources of the computer's operating system. These resources include a wide variety of personalization tools that are not available in browser-based environments. For example, a computer's operating system includes environmental settings (in registry and system files) that can be accessed and modified by executing programs. Standalone applications can also access and save files, including personalization data, on local drives. These resources are used to provide a high degree of customizability to standalone applications. Unfortunately, these resources and the personalization utilities that depend on them are not directly portable to browser based environments. For example, security protocols prevent server side applications from reading and writing to files larger than a cookie on a client system. The degree of personalization found in large standalone applications requires access to template and registry files at a frequency that is currently impractical and generally undesirable in an internet environment. In addition, this approach results in personalization restricted to the individual user or client level.

The limitations of thin clients have prevented the implementation of true internet enterprise applications and the relative perspective of the standalone and client/server environments likewise prevented even their consideration for this purpose. Features important to implementation of enterprise solutions, such as customization of functionality and transformation to a keyboard based interaction model, are simply not available in prior art internet applications.

SUMMARY OF THE INVENTION

The present invention includes systems and methods for customization of internet applications and their associated user interfaces in a browser based environment. The user interfaces are typically delivered to a user as a web page or part thereof. The customization applies to both static and functional aspects of user interface elements.

One embodiment of the present invention includes a customizable application system comprising an internet application system configured to support an internet application, the internet application associated with metadata configured for generating an application user interface including a plurality of user interface elements having a tab-order property, the internet application system including both an application server configured to generate the application user interface and a web application server configured to deliver the application user interface to a client. The embodiment further includes a personalization system with a personalization engine and a user profile interface, the personalization interface configured to modify personalization data characterizing the tab-order property such that the tab-order of the plurality of user interface elements is modified, and a data repository including a data record for storing the personalization data, the data record being accessible using the metadata.

One embodiment of the present invention includes a method of developing a customizable user interface element by developing a user interface element including the property, determining a data record for holding a value used to characterize the property, the data record being stored in a data repository and being user modifiable, the data repository being physically remote from a client used to display an application user interface, generating metadata defining the property, the metadata including a reference to the data record, and storing the metadata in association with the user interface element, the user interface element being configured for inclusion in the application user interface.

One embodiment of the present invention includes a method of customizing an application user interface by accessing a page definition, the page definition including metadata associated with a customized property of a user interface element, accessing the metadata to obtain a reference to a data record, using the reference to access the data record, the data record being stored in a data repository and being user modifiable, the data repository being physically remote from a client used to display an application user interface, accessing the data record to determine a value defining the customized property, generating markup-language responsive to the determined value, and including the generated markup-language in the application user interface.

One embodiment of the present invention includes a customizable application system comprising an internet application system configured to support an internet application, the internet application associated with metadata configured for generating an a plurality of application user interfaces each having customizable interaction model, the internet application system including both an application server configured to generate the application user interface and a web application server configured to deliver the application user interface to a client. The embodiment further includes a personalization system including a personalization engine and a user profile interface, the personalization interface configured to modify personalization data characterizing the interaction model such that the interaction model in more than one of the plurality of application user interfaces is modified, and a data repository including a data record for storing the personalization data, the data record being accessible using the metadata.

One embodiment of the present invention includes a method of developing a customizable application user interface associated with an internet application by selecting a customizable interaction model associated with a data record, the data record being stored in a data repository and being user modifiable, the data repository being physically remote from a client used to display the application user interface, including the interaction model in the application user interface, generating metadata associated with the interaction model, the metadata including a reference to the data record, and storing the metadata in association with the internet application, the internet application being configured for access using the application user interface.

One embodiment of the present invention includes a method of customizing an application user interface by accessing a page definition, the page definition including metadata associated with a customized property of a interaction model, accessing the metadata to obtain a reference to a data record, using the reference to access the data record, the data record being stored in a data repository and being user modifiable, the data repository being physically remote from a client used to display an application user interface, using information read from the data to determine a value defining the customized property, generating markup-language responsive to the determined value, and including the generated markup-language in the application user interface.

An embodiment of the present invention includes a customizable application system comprising an application server, an application interface generator configured to generate an application user interface, the application user interface including a customizable immediate access keystroke sequence and configured as an interface between the application server and a client, a web application server configured to deliver the application user interface to a client, means for specifying customization data configured to characterize the customizable immediate access keystroke sequence, a data depository configured to store the customization data, and means for generating the application user interface according to the customization data.

An embodiment of the present invention includes a method of developing a customizable user interface element by selecting a customizable immediate access keystroke sequence, developing a user interface element associated with the customizable immediate access keystroke sequence, determining a data record for holding a value used to characterize the customizable immediate access keystroke sequence, the data record being stored in a data repository and being user modifiable, the data repository being physically remote from a client used to display an application user interface, generating metadata defining the customizable immediate access keystroke sequence, the metadata including a reference to the data record, and storing the metadata in association with the user interface element, the user interface element being configured for inclusion in the application user interface.

An embodiment of the present invention includes a method of customizing an application user interface by accessing a page definition, the page definition including metadata associated with a customizable immediate access keystroke sequence, using the metadata to access a data record, the data record being stored in a data repository and being user modifiable, the data repository being physically remote from a client used to display an application user interface, using information read from the data record to determine a value defining the customizable immediate access keystroke sequence, generating markup-language responsive to the determined value, and including the generated markup-language in the application user interface.

An embodiment of the present invention includes a customizable application system comprising an application server, an application interface generator configured to generate an application user interface, the application user interface including a customizable view all command and configured as an interface between the application server and a client, a web application server configured to deliver the application user interface to a client, means for specifying customization data configured to characterize the view all command, a data depository configured to store the customization data, and means for generating the application user interface according to the customization data.

An embodiment of the present invention includes a method of developing a customizable application user interface associated with an internet application by selecting a customizable view all command associated with a data record, the data record being stored in a data repository and being user modifiable, the data repository being physically remote from a client used to display the application user interface, including the view all command in the application user interface, generating metadata associated with the view all command, the metadata including a reference to the data record, and storing the metadata in association with the internet application, the internet application being configured for access using the application user interface.

An embodiment of the present invention includes a method of customizing an application user interface by accessing a page definition, the page definition including metadata associated with a customized property of a view all command, accessing the metadata to obtain a reference to a data record, using the reference to access the data record, the data record being stored in a data repository and being user modifiable, the data repository being physically remote from a client used to display an application/user interface, reading information from the data record, using the information read to determine a value defining the customized property, generating markup-language responsive to the determined value, and including the generated markup-language in the application user interface.

An embodiment of the present invention includes an application system comprising an internet application system configured to support an internet application, the internet application associated with metadata configured for generating an application user interface, the internet application system including both an application server configured to generate the application user interface and a web application server configured to deliver the application user interface to a client. The embodiment further includes an application development system configured to generated the metadata, the metadata being further configured to characterize a customizable find command included in the application user interface a configuration system including a configuration engine and a configuration interface, the configuration interface configured to modify configuration data characterizing the customizable find command, and a data repository including a data record for storing the configuration data, the data record being accessible using the metadata. In this embodiment the find command is optionally customizable to search data displayed in the application user interface. In this embodiment the find command is also optionally customizable to search all rows associated with a result, a subset of all rows being displayed in the application user interface.

An embodiment of the present invention includes an application system comprising an internet application system configured to support an internet application, the internet application associated with metadata configured for generating a plurality of application user interfaces each having a customizable find command, the internet application system including both an application server configured to generate at least one of the plurality of application user interface and a web application server configured to deliver the at least one of the plurality of application user interfaces to a client, the find command being customizable either to search all of a result or to search only a subset of the result being displayed in the at least one of the application user interfaces. The embodiment further includes a personalization system with a personalization engine and a user profile interface, the personalization interface configured to modify personalization data characterizing the customizable find command such that the customizable find command in more than one of the plurality of application user interfaces is modified, a data repository including a data record for storing the personalization data, the data record being accessible using the metadata.

An embodiment of the present invention includes a method of customizing an application user interface by accessing a page definition, the page definition including metadata associated with a customized property of a find command, the customized property including the scope of a search, accessing the metadata to obtain a reference to a data record, using the reference to access the data record, the data record being stored in a data repository and being user modifiable, the data repository being physically remote from a client used to display an application user interface, accessing the data record to determine a value defining the customized property, generating markup-language responsive to the determined value, and including the generated markup-language in the application user interface.

BRIEF DESCRIPTION OF THE VARIOUS VIEWS OF THE DRAWING

FIG. 13B illustrates the focus of a user interface located on a calendar button;

FIG. 13C is an expanded view of a portion of FIG. 13B.

FIG. 13D illustrates the focus of a user interface located on a status drop down list;

FIG. 14C illustrates the result of executing a view all command;

FIG. 17B illustrates an example of an option that allows a user to change the interaction model while the internet application is running.

DISCLOSURE OF THE INVENTION

Figure 1:
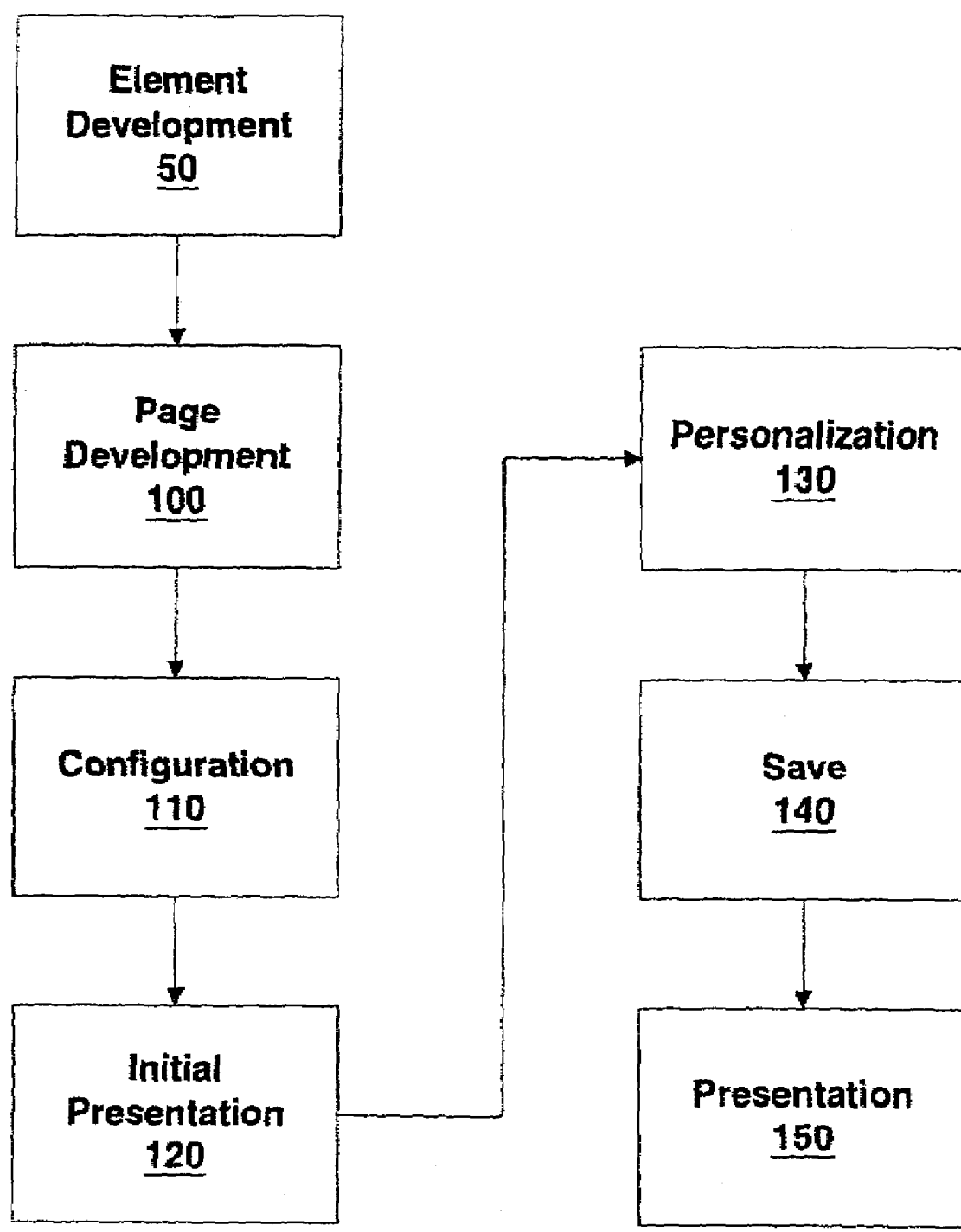
FIG. 1 illustrates an embodiment of a user interface configuration and personalization process representative of the present invention.

A new approach to designing, implementing and using user interfaces is disclosed. This approach overcomes restrictions imposed by prior art technology and philosophy and includes new design methods that permit implementation of user interfaces more appropriate for use as interfaces between consistent users and application programs. In particular, user interfaces developed using these methods are no longer constrained by the basic point and click interaction model. The new approach includes a unique system architecture, useable by user interface developers to provide advanced customization and user control within an HTML environment. The provided features include user modification of page element functionality and are thus important to the development, deployment and use of enterprise solutions as internet applications.

The unique system architecture of the present invention allows internet application developers to include customizable user interface elements in application user interfaces. The customizable properties of these elements include, but are not limited to, alternative functionality, arrangement and visibility. Customization of user interface elements includes both "configuration" that is applicable to multiple users and "personalization" that is applicable to an individual user. Personalization is a special case of configuration wherein information is modified by or for individual users and saved in an individual user profile. Configuration information is modified by a privileged user, such as a supervisor, and saved in a database associated with an internet application. Both the user profile and configuration information are stored at a location physically remote from client-side access systems, such as client web browsers. These aspects of the system architecture avoid substantial client side processing or storage and thereby eliminate dependence on client-side environments. The advantages inherent in this system architecture are achievable through an HTML based browser interface.

The new approach to user interface and web page design and interaction satisfies needs of consistent users through a browser compatible interface. These needs include giving users the ability to customize the functionality of user interface elements associated with underlying internet application programs. For example, using the present invention a user is able to control methods of data input and output, the presentation of requested information, logical operations, or characteristics of communication between the browser compatible interface and servers. Configuration and personalization can be applied to individual user interface elements, individual user interfaces and associated web pages, all internet application user interfaces accessed by a user, or groups of user interfaces within a specific internet application. Control of functionality is particularly important in applications designed as enterprise solutions. These types of applications are often used by consistent users who benefit significantly from interfaces evolved beyond the basic point and click interaction model.

Interaction between a user and an application includes input the user supplies to the application and output presented to the user by the application. For example, a user may select user interface elements with a pointing device (e.g., a mouse), enter data in a field using a keyboard or voice recognition software, or use keystrokes to control an application. Configurable properties of user interaction include defining the function of "hotkeys" and automatically placing a cursor in a preferred data entry field. Providing customization of this type allows a user to choose between the basic point-and-click interaction model and a keyboard based interaction model. Under many circumstances the keyboard based interaction model enabled by the present invention is more efficient and preferred.

The presentation of application output is customized with regard to the style of presentation, the amount of data presented on a single page, the order in which the data is shown, and the aspects of the data made visible, among others. For example, in some circumstances it is preferable to display just enough data to fill the viewing area available to a browser. In other circumstances it is preferable to display data in a style suitable for users with diminished eyesight.

A functional property of a user interface element can include logic, data processing, and responsiveness to user input. For example, checking that data entered in a form field has an acceptable format is a functional property of the form field element. This type of syntactic processing is typically performed by scripts included within the user interface. Likewise, responsiveness to a hotkey can be a functional property of a menu item. The functionality of user interface elements also includes the underlying processes associated with each element. For example, in an application interface, the underlying processes can include "business logic" typically executed on a server and designed to assure the validity of entered data. Business logic routines apply business rules such as range checking. This type of business logic may, for instance, be used to check that a start date is on or before a finish date. Other examples of user interface element functionality include displaying error messages, modifying the order of element focus, and controlling when data is passed from a client to business logic processes performed on a server. Providing customization of functional properties of user interface elements is an advantage derived from embodiments of the present invention.

FIG. 1 illustrates an embodiment of a user interface configuration and personalization process representative of the present invention. The method begins with an element development step 50. In this step one or more individual user interface elements are designed or selected from a library of predefined user interface elements. These elements are configured for inclusion in an application user interface. In step 50, each element is optionally associated with an underlying internet application. For example, in one embodiment a predefined data entry field is selected and associated with a procedure of the internet application configured to receive data entered in the field. In another example, a menu item on a user interface is associated with an underlying procedure that performs the process referred to by the menu item.

The user interface elements developed in step 50 are optionally specified as having customizable properties. These properties are either attributes of a predefined user interface element or are selected during the design of the element by the user interface developer. For example, in one embodiment the specification process is simplified by accessing a library of user interface elements including properties that are customizable by default. In another embodiment a user interface element, including at least one configurable property, is designed from basic elements or a preexisting template. Step 50 optionally includes determination of a data record used to hold a value characterizing a customizable property of the user interface element and generation of metadata including a reference to the data record. Default values are typically stored in the data record.

In a page development step 100 an application user interface, incorporating a user interface element developed in step 50, is designed. The design process includes positioning of user interface elements, with configurable features and definition of default values for these features and their configurable aspects, with respect to the application user interface. Step 100 is typically performed by a developer involved in the creation and/or publication of the application user interface. The developer can include programmers, designers, graphic artists, publishers, and other parties involve in producing the application user interface and associated web pages. For example, in one embodiment a programmer designates initial user interface elements and layout, while a specialist familiar with a specific application sets default values. The information collected and generated in step 100 is stored in the form of metadata such as PeopleCode®, page definitions, and other data formats. This information includes data records and metadata prepared in step 50 and defines the application user interface. The storage is in a location separate from the browser compatible system (client) of a user.

PeopleCode, developed by PeopleSoft, Inc., is a well-known program specification language used in the development of enterprise applications. It may, for example be used to implement business logic related to the internet application. The metadata approach enhances the maintenance of internet applications, simplifies upgrade processes and, as described herein, enables multiple layers of customization in an internet environment. In addition, the use of metadata also enhances portability, by enabling support of various database systems, server environments, and browsers.

In an optional configuration step 110, customization of the application user interface developed in step 100 is performed by a privileged user, such as a system administrator, application specialist, or the like. This customization is the basis for a hierarchical set of configuration and personalization layers each typically having a narrower scope and taking priority over more general layers. For example, in one instance a supervisor selects which application user interfaces are available to sales personnel and a member of the sales team specifies how a specific application user interface should function when the member accesses it. In this example, personalization specified by the member of the sales team takes priority over configuration specified by the supervisor. The configuration data provided by the supervisor in step 110 is stored for retrieval during application user interface generation. In alternative embodiments customization is responsive to the identity of a client rather than the identity of a user. Thus, users accessing the internet application from a client located in the sales department are presented with a user interface customized for that department.

Each configuration and personalization layer may apply to a different scope within an internet application. For example, in one embodiment a configuration specification applies to a specific application component. An application component is a collection of user interface elements, associated application code, and other aspects of an internet application that perform a specific task or set of related tasks as part of an internet application. For instance, an application component may include a set of user interface elements and underlying application code used to accept a sales order or, alternatively, to generate a sales report. An application component optionally includes one or more application user interfaces that further include personalized user interface elements. These application user interfaces are part of an internet application including the application component and are used to communicate with a user. In other examples, customization applies to an entire internet application, users or clients who are members of a group, groups of application user interfaces, and the like.

In an optional initial presentation step 120, the application user interface developed in step 100 is presented to a user through a browser compatible interface such as a web browser. The application user interface is typically served as part of a web page over a computer network such as the Internet or an intranet. Since in preferred embodiments the system architecture relies only on the features available in a standard web browser, the presentation does not depend on additional client side resources such as direct access to significant storage or processing of additional client side computer code. The application user interface is presented through any web browser compatible system and the browser compatible system does not require add-ons, plug-ins, or extensions to support additional features.

In a personalization step 130 the user optionally customizes elements of the application user interface presented in step 110. The user accesses a personalization utility associated with their user profile. The personalization utility is typically but not necessarily integrated as part of the internet application. This utility is used by the user to select and modify one or more personalization options available to the user. In a save step 140, any modifications made in step 130 are saved as personalization data associated with the application user interface and the user's profile. The personalization data is preferably saved at a location separate from the browser compatible system of the user and is accessed using a user-associated key such as a user ID and/or password.

In a presentation step 150 the application user interface is again presented to the user through a browser compatible interface. During presentation step 150 the configuration data developed in step 110 and the personalization data saved in step 140 is used to modify the presented application user interface. The modification is performed by a user interface generation engine that accesses the saved configuration and personalization data and default page information defined in step 100. The output of the page generation engine is markup-language data, such as HTML data, suitable for presentation as a web page, JavaScript®, and the like, that is presented through a browser compatible interface without requiring browser add-ons or plug-ins. The output of the page generation engine is differentiated from Java® code, ActiveX®, and other add-ons, plug-ins, or tools used to extend browser functionality, in that the output is downloaded to a client as an integral part of an associated user interface and thus does not reside on the client independently from the associated user interface.

A detailed description of the unique system architecture, used to support the method illustrated by FIG. 1, is presented herein. This discussion includes several illustrative examples in which the system architecture is used to configure and personalize functional properties of user interface elements associated with an application. In one example, a user modifies means of user input and ways in which the application responds to this input. In another example, a user selects how requested data is presented to a user. In yet another example, a user selects between interaction models used for communication between the browser interface and server-side components of an application. These examples are meant to be illustrative. The systems and methods disclosed are optionally used to provide user customization of any functional or non-functional property of a user interface.

In the preferred embodiment of the present invention, the unique system architecture uses a standard web browser as a client and does not require additional client-side application software. Internet application programs supported by the invention can use a standard web browser for user interaction because the user interface (web page) generated by the present invention is based on HTML and JavaScript that is independent of proprietary browser extensions such as vendor-specific Dynamic HTML, Java Code based user interface extensions, or other client-side controls and code. The generated interface also takes advantage of the capabilities of browsers and the internet, such as hyperlinks, and is thus not merely an emulation of a Microsoft Windows® interface.

The internet application user interface is generated at a server, delivered to the client web browser in HTML/JavaScript form, and rendered for the user at the client device. Nothing is required of the client other than the ability to support standard browser protocols such as HTTP and HTML. No additional executables are required on the client.

The system supporting the browser client does not have to be a traditional web browser, such as Microsoft Internet Explorer® or Netscape Navigator®, running on a personal computer. The client is alternatively a handheld wireless device such as a cellular phone or some other browser compatible device. Wireless applications use an architecture, known as Wireless Access Protocol (WAP), that is similar to that used by traditional internet-based applications accessed through a web browser running on a personal computer. The WAP application standard is based on internet standards, such as Extensible Markup Language (XML), HyperText Transfer Protocol (HTTP) and Secure Sockets Layer (SSL). The architecture of the present invention is well suited to the characteristics of limited functionality (e.g., available memory and processing power) systems including many wireless and non-wireless devices.

Figure 2:
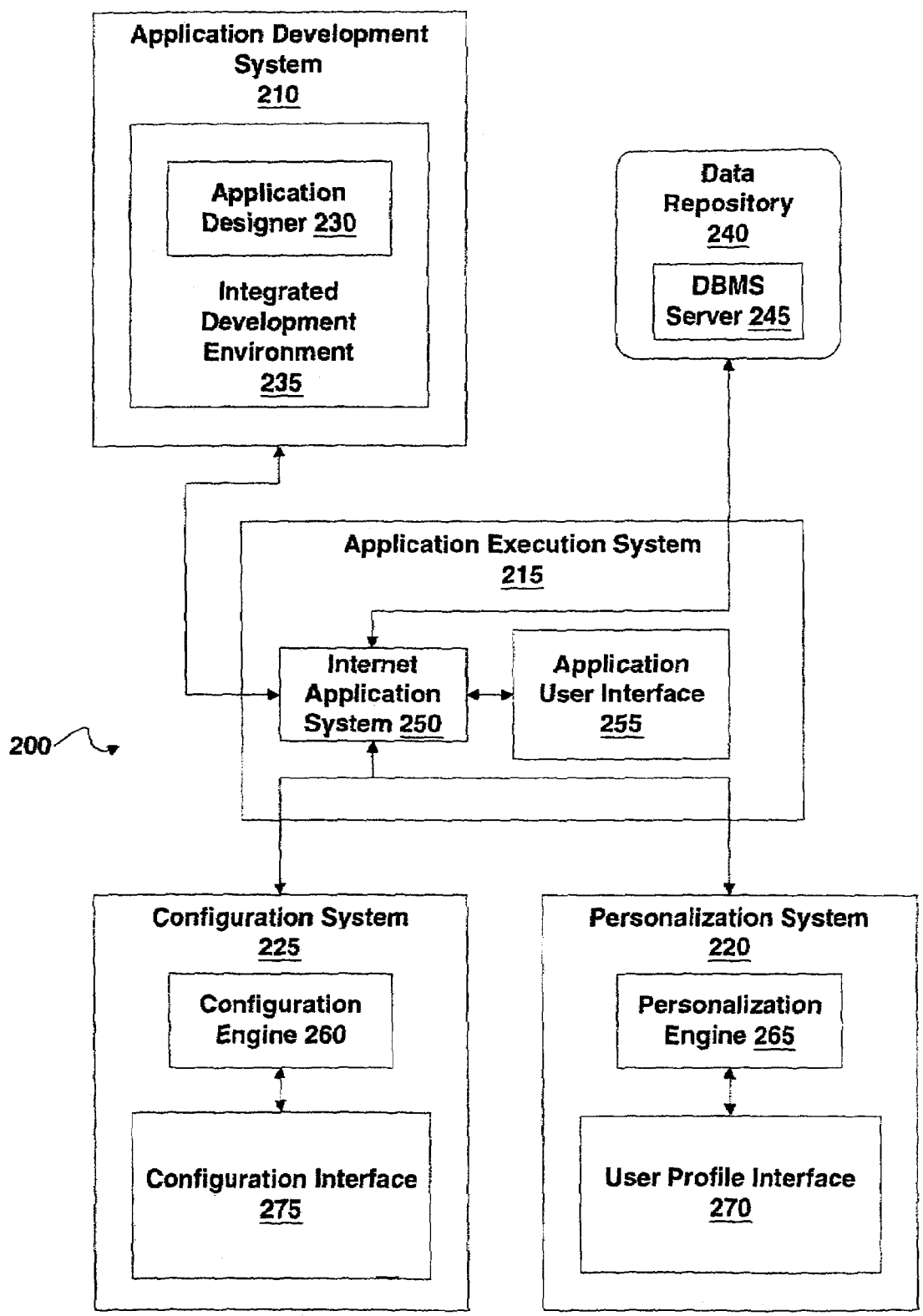
FIG. 2 illustrates elements of a customizable application system in accordance with an embodiment of the present invention.

FIG. 2 illustrates elements of a customizable application system, generally designated 200, in accordance with an embodiment of the present invention. These system elements include an application development system 210, an application execution system 215, and at least one or both of an optional personalization system 220 and an optional configuration system 225.

Application development system 210 is used by application developers to develop user interface elements in step 50 (FIG. 1) and to layout these elements in a user interface in step 100. In one embodiment the user interface is integrated into the internet application associated with the user interface elements. Steps 50 and 100 of FIG. 1 are preferably accomplished using an application designer 230 accessed through an integrated development environment (IDE) 235.

IDE is optionally used for user interface development without requiring that a user interface developer directly write HTML or JavaScript. As shown herein, HTML and JavaScript are subsequently generated automatically. IDE 235 has many features and commands in common with graphical software development systems such as Visual Basic® as well as HTML page design tools found in systems such as Microsoft FrontPage®. Thus IDE 235 is both a program development tool and a design tool for designing browser compatible user interfaces (web pages). For example, in one embodiment IDE 235 is used to develop a user interface element, associate the user interface element with an internet application, position the element on a user interface, and designate the generation of PeopleCode for checking the validity of data entered using the user interface element. IDE 235 is used to perform steps 50 and 100 as illustrated in FIG. 1.

Application designer 230, is responsive to user input received by IDE 235 and generates metadata defining a user interface, customizable elements within the user interface, and the association between elements of the user interface and processes and application data of an underlying application. Metadata is definitional data that provides information about or documentation of other data managed within a data processing application. Metadata is used, for example, to define object definitions within the system, such as business processes, components, fields, file layouts, indexes, menus, messages, pages, PeopleCode programs, queries, and other records. This metadata is stored in a data repository 240 typically including a database management server (DBMS) 245. Metadata is modified using application development system 210.

Application execution system 215 includes an internet application system 250 arranged to support an application program and manage an associated HTML/JavaScript based application user interface 255. Internet application system 250 receives data generated using IDE 235 and stores it in Data Repository 240. During internet application execution internet application system 250 retrieves data from data repository 240 and uses the retrieved data to generate a customized application user interface 255 displayed to a user in one or more web pages. Application user interface 255 is an HTML based interface typically generated in response to a user request. The retrieved data optionally includes information that has been modified by a user as part of a customization. Application execution system 215 is used during initial presentation step 120 and presentation step 150 of FIG. 1.

Personalization system 220 is accessed through a user profile interface 270 and includes a personalization engine 265 configured for a user to modify information stored in data repository 240. As with other elements of the invention, personalization engine 265 and user profile interface 270 are optionally integrated directly into internet applications supported by and accessed through the invention. Personalization system 220 is used during personalization step 130 of FIG. 1.

Configuration system 225 includes a configuration engine 260 and a configuration interface 275. Configuration system 225 is typically arranged to modify an entire application, a part thereof, or the preferences of more than one user. Use of configuration system 225 generally requires greater access permissions than personalization system 220. Configuration system 225 is typically used to set group, department (sales, accounting, etc.) or enterprise wide preferences in configuration step 110 of FIG. 1.

Figure 3:
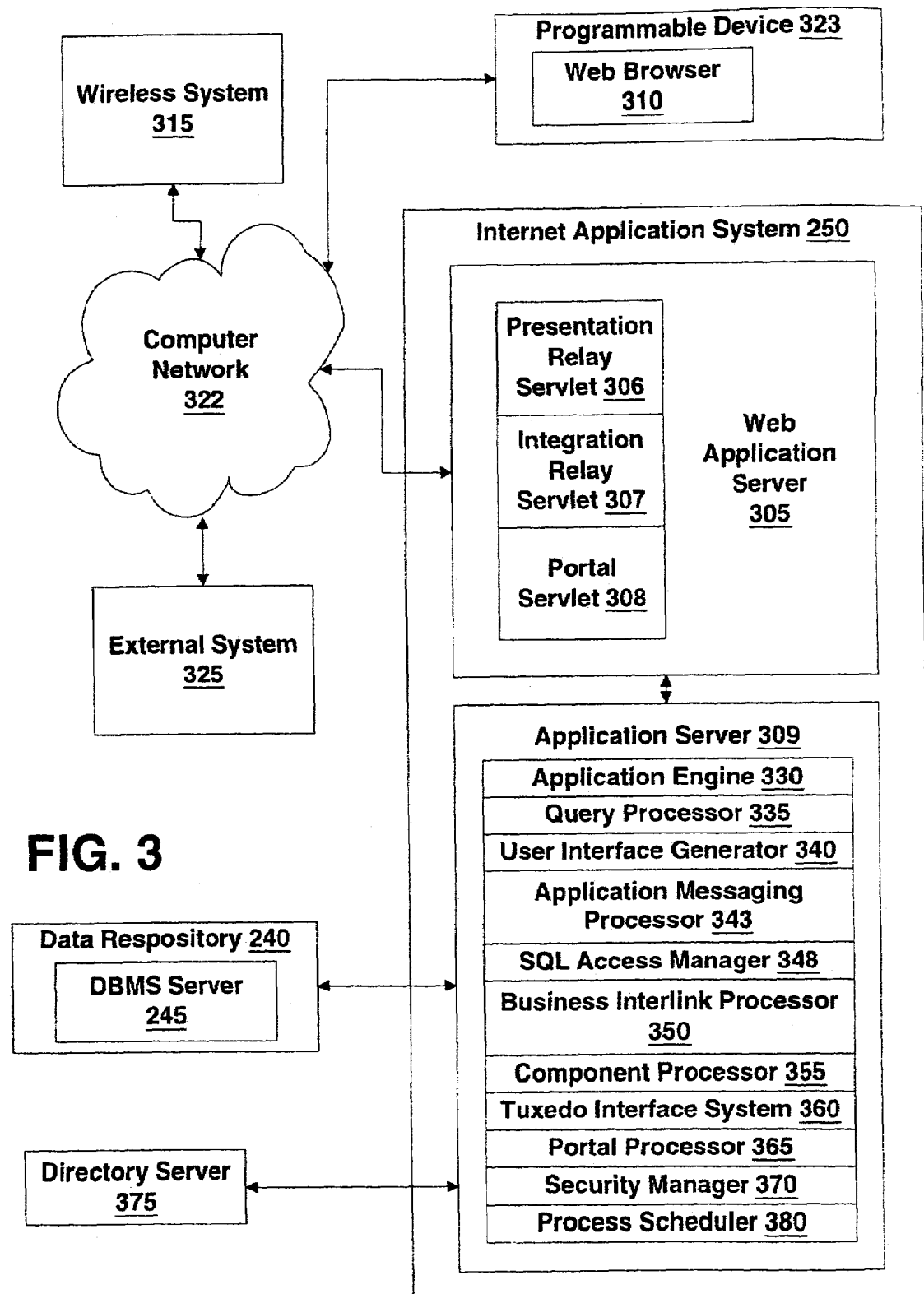
FIG. 3 illustrates an embodiment of an internet application system and associated components of the invention.

FIG. 3 illustrates an embodiment of internet application system 250 and associated components of the invention. Internet application system 250 typically includes a web application server 305 configured as an interface to outside systems and an application server 309 configured to support the execution of internet applications and generate application user interface 255 (FIG. 2). One embodiment of web application server 305 includes subsystems well known in the art such as presentation relay servlet 306, integration relay servlet 307, and portal servlet 308.

Web application server 305 communicates, using standard protocols, with outside systems such as a web browser 310 within programmable device 323, a wireless system 315, and an external system 325. This communication is typically through a computer network 322, such as a local network, a wireless network, a wide area network, the internet, or the World Wide Web. Web browser 310 executes on a programmable device 323 such as a workstation, personal computer, personal digital assistant, or the like. Alternatively, web application server 305 communicates with a wireless system 315 using HTTP and WAP. Web application server 305 optionally includes utilities, such as WebSphere® (International Business Machines, Armonk, N.Y.), and WebLogic® (BEA Systems, Inc., San Jose, Calif.), that are well known in the art. These utilities serve to perform the functions expected of a web server and as interfaces between web application server 305 and components of application server 309.

Application server 309 is configured to support and execute the internet application program. These tasks include the generation of HTML/JavaScript based application interface 255. In one embodiment internet application system 250 uses an application engine 330 to execute application logic. Application engine 330 is a batch processing program optionally used to execute business logic developed by an application designer. Query processor 335 is used to execute queries that are generated by a system user. In some embodiments aspects of application server 309 are configured to make use of external code such as program modules written in C++ or the like. Application messaging processor 343 is used to send and receive messages between applications for application to application integration. User interface generator 340 produces customized application user interface 255 (FIG. 2). Interface generator 340 and query processor 335 are supported by SQL access manager 348. In support of interface generator 340, SQL access manager is used to form queries for the retrieval of data, such as configuration data, from data repository 240 (FIG. 2). These queries are applied to databases, such as DBMS server 245 (FIG. 2).

Application server 309 further includes a business interlink processor 350 configured to facilitate communication with and execution of third party applications that are optionally used to add functionality to the internet application as is well known in the art. A component processor 355 is configured to execute aspects of the internet application. Application server 309 also includes server utilities well known in the art, such as a Tuxedo® interface system 360 from BEA Systems (San Jose, Calif.) which is used in the execution of business logic. Application server 309 contains other elements well known in the art such as an optional portal processor 365 that is used to handle the processing of data requests and instructions passed to and from user-application interface 255 (FIG. 2) when user-application interface 255 works inside a portal, a security manager 370, a directory server 375, and a process scheduler 380.

DBMS server 245, within data repository 240, stores personalization data associated with each user profile and configuration data associated with each internet application supported by the present invention. Information associated with the internet application and each user is held in DBMS server 245 or elsewhere within data repository 240. This information can include, for example, application data tables, metadata, configuration data, and the like.

Figure 4:
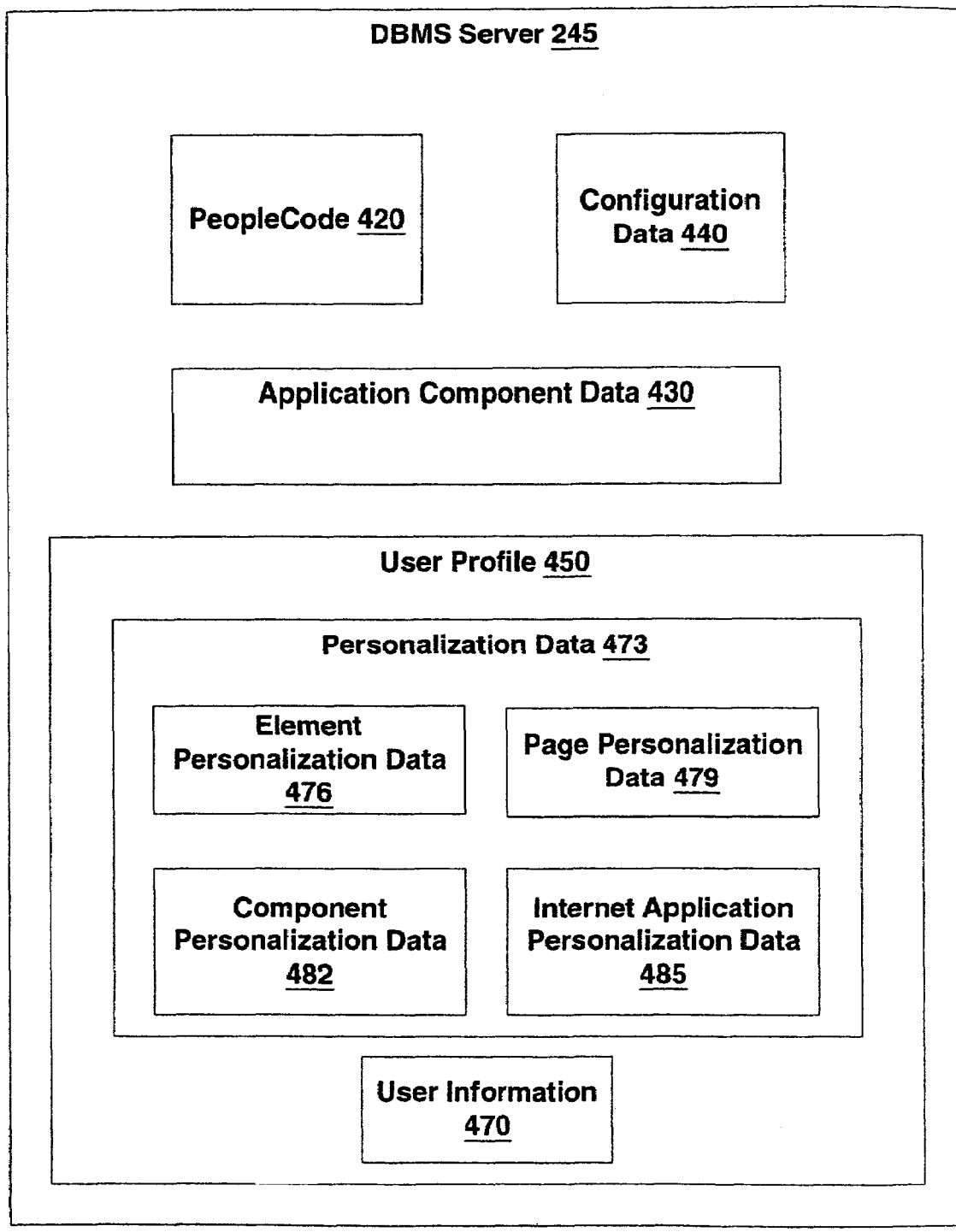
FIG. 4 illustrates an embodiment of a DBMS server.

FIG. 4 illustrates an embodiment of DBMS server 245 (FIG. 2). DBMS server 245 includes system data, metadata such as PeopleCode 420 and application component data 430, configuration data 440, and user data such as a user profile 450. Application component data 430 includes information associated with specific application components, such as the relationships between user interfaces and underlying application code, application data, application processes, PeopleCode, and the like. DBMS server 245 is optionally located on one or more computing devices physically separate from internet application system 250 (FIG. 2).

One embodiment of an application component is arranged for order entry. This application component is associated with application component data 430 specifying properties of user interfaces arranged to allow users to enter buyer and product information relating to an order. These user interfaces are included in several embodiments of application user interface 255 (FIG. 2) and are configured for entering account information, items being ordered, and such.

Application component data 430 optionally includes aspects of configuration data 440, and aspects of supporting PeopleCode 420 (FIG. 3), and is typically developed using application development system 210 (FIG. 2). Configuration and personalization at the application component level is advantageous because user interaction with an internet application is often characterized by performance of a specific task or set of related tasks. Configuration data 440 is therefore optionally included as an aspect of application component data 430.

Configuration data 440 includes information used to customize a user interface before the user interface is included in an embodiment of application user interface 255. Configuration data 440 optionally is populated with default values using application development system 210 during page development step 100 (FIG. 1) and is also modified using configuration system 255 during configuration step 110. In alternative embodiments configuration data 440 is specific to the internet application, groups of users, individual user interfaces, geographic locations, or the like. In these embodiments configuration data is also optionally stored in association with specific application components or other aspects of an internet application.

Personalization data 473 is configuration data 440 that is specific to an individual user and is optionally found in association with a user profile 450. In alternative embodiments user profile is associated with a specific user, a class of users, a specific client or a class of clients. In addition to personalization data 473, user profile 450 includes user information 470 which is composed of data such as a user's name, a user ID, user privileges, and the like. Personalization data 473 includes element personalization data 476, page personalization data 479, component personalization data 482 and internet application personalization data 485. These data are used for personalization at the element, component, individual application web page, and internet application levels respectively.

Metadata stored in DBMS server 245 are used by processes on application server 309 to generate the application user interface 255. These metadata are used to define HTML and JavaScript data included in an embodiment of application user interface 255. Specifically these metadata include data defining specific user interface elements, such as data records containing specific fields used to store properties of the user interface elements. The metadata also include menu definitions, page definitions, PeopleCode, business process definitions, and the like. The use of metadata in the user interface generation process is a property of the present invention that simplifies the incorporation of customized information in the resulting user interface. Metadata includes references, such as queries or pointers, to data records holding user defined data customized using configuration system 225 and/or personalization system 220. As shown herein, metadata is used by processes on application server 309 to retrieve appropriate configuration and personalization data at the time of user interface generation.

In an alternative embodiment of data repository 240 (FIG. 2) the metadata further includes information defining the type of data that can be found in a specific data record. This feature allows an individual data record within DBMS server 245 to hold data of variable type. For example, a record may hold a specific value, or alternatively, an SQL query configured to retrieve a specific value from another part of DBMS server 245 or another location. In this embodiment user interface generator 340 (FIG. 3) uses information associated with the metadata to determine the type of data stored in the data record and process it accordingly.

In various embodiments of the present invention, metadata is edited or generated as a result of a developer using application development system 210 (FIG. 2). For example, during page element development step 50 (FIG. 1) a developer defines or selects a user interface element and associates it with a procedure (function) of an internet application. This results in the definition of metadata fields used to store properties of the user interface element. These fields are included in data records stored in data repository 240. In one embodiment the developer specifies specific aspects of the user interface element to be customizable. During Page Development step 100 the user interface element is included in a specific application user interface 255. As a result, metadata is generated indicating properties such as the relative location of the user interface element in the specific application user interface 255. If a property of the user interface element is customizable, the metadata is used by the SQL access manager 348 to generate means, such as an SQL query, for accessing values stored elsewhere, such as configuration data 440 or personalization data 473. In practice, these values stored elsewhere are adjustable using configuration system 225 and/or personalization system 220 (FIG. 2).

Using metadata to define properties of a user interface element, an entire application user interface 255 or an application component, and using the metadata in combination with the customization data to generate application user interface 255 when needed, allows any property, both functional and static, of a user interface element to be customizable. In addition, since configuration data 440 and personalization data 473 are optionally separate from other aspects of an internet application, various users can be subject to various sets of configuration (and personalization) data. Therefore, two users can see different customized versions of the same application component, as presented through application user interface 255. This can occur even while both users are accessing the component at the same time.

Figure 5:
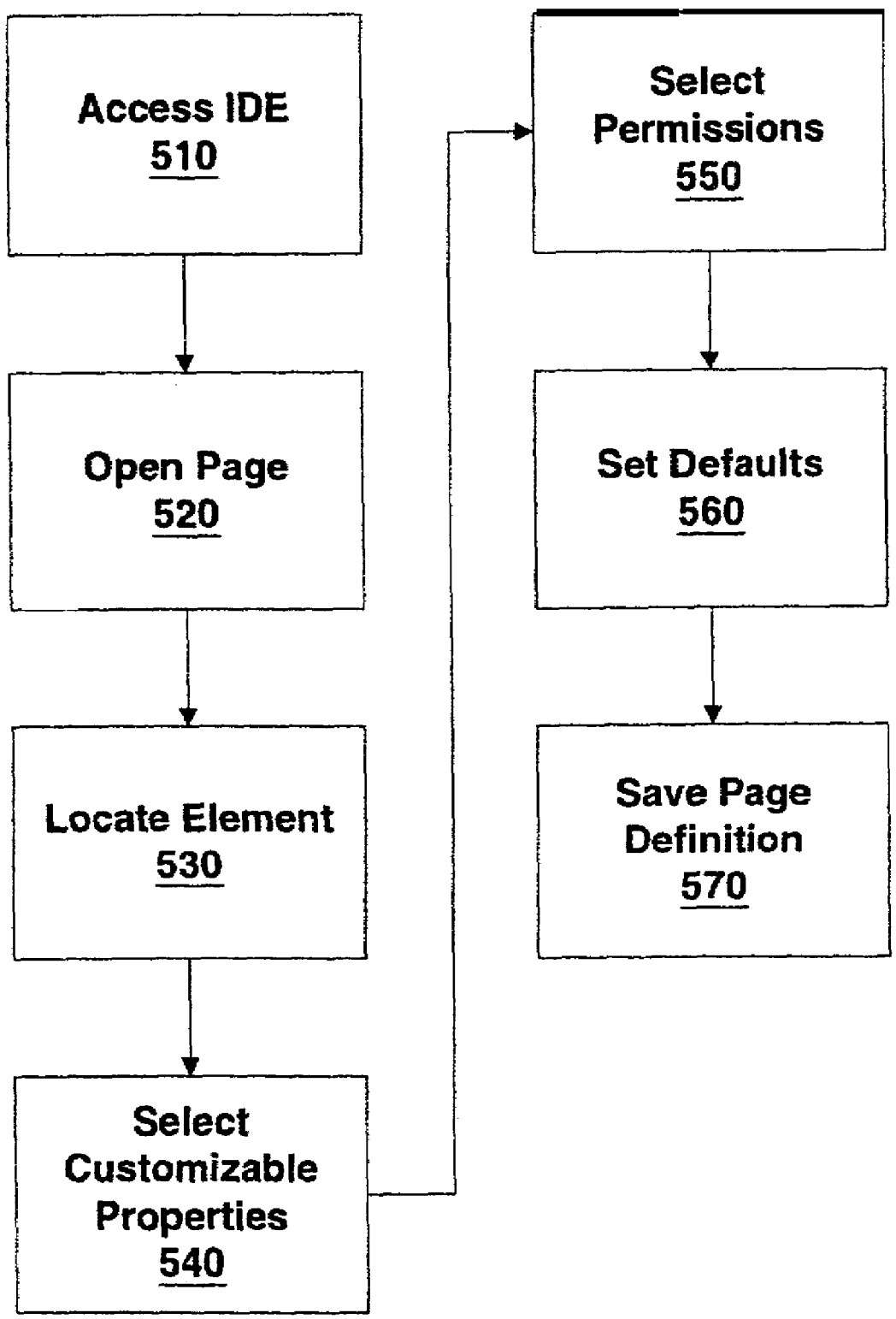
FIG. 5 illustrates an embodiment of a page development step that includes generation of metadata.

FIG. 5 illustrates an embodiment of page development step 100 (FIG. 1) that includes generation of metadata. As discussed with reference to FIG. 1, in step 100 a developer uses IDE 235 (FIG. 2) to add or modify user interface elements on an application user interface 255. In addition to selecting and positioning user interface elements, a developer can optionally specify default values for a user interface element. The process begins in an access IDE step 510 wherein a developer accesses application designer 230 using IDE 235. In an open page step 520 a new or existing application user interface 255 is opened in IDE 235. In some embodiments step 520 includes opening a group of application user interfaces 255, related to an application component, to be developed as a single unit. In a locate element step 530 a user interface element is selected and located (positioned) on the user interface opened in step 520. The user interface element may include text, graphics, images, fields, buttons, and the like.

In a select customizable properties step 540 a property of the selected user interface element is selected by the developer using IDE 235. This property is a customizable property of the user interface element by default if the user interface element was selected in step 50 (FIG. 1) from a library of previously defined customizable elements. Alternatively, if the user interface element was developed by a developer in step 50, then the property is customizable because it was specifically specified as being customizable by the developer. This specification is used to generate metadata that enables administrators or other users to later change (customize) the property of the selected user interface element.

In an optional select permissions step 550 permissions for performing configuration or personalization of the property selected in step 540 are determined. The ability to customize a property is optionally dependant on security aspects such as a password and/or the identity of a user or client. The permissions set in step 550 are default values that may later be changed by a supervisor or other privileged user. In an optional set defaults step 560 further default values associated with the configurable property are determined. For example, if the configurable property is a number of columns to show in a table, then an actual value for the number of columns is set in step 560. In alternative embodiments step 560 is performed as part of a separate process, for example during installation of the internet application.

Page development step 100 (FIG. 1) is concluded with a save page definition step 570 that makes the developed application user interface 255 (FIG. 2) and associated internet application functionality accessible to users. In this step metadata associated with the application including customizable and static aspects of application user interface 255 are generated and saved in metadata and optionally non-metadata formats. Information saved can include the application user interface 255, PeopleCode 420, application component data 430, and the like. Metadata optionally includes segments of HTML and JavaScript as well as information about attributes of specific data records. These attributes optionally include the data format of the data record, information about a configurable property or a reference to customization data such as page personalization data 479. In an alternative embodiment a data record includes metadata indicative of the data format found in a specific metadata field. For example, in one instance a data record includes information indicating that the next data field contains a URL. Characteristics of the metadata indicate to a process accessing the metadata record that the next data field is to be treated accordingly. Data saved in step 570 is saved in a location, such as data repository 240, that is accessible to internet application system 250.

Figure 6:
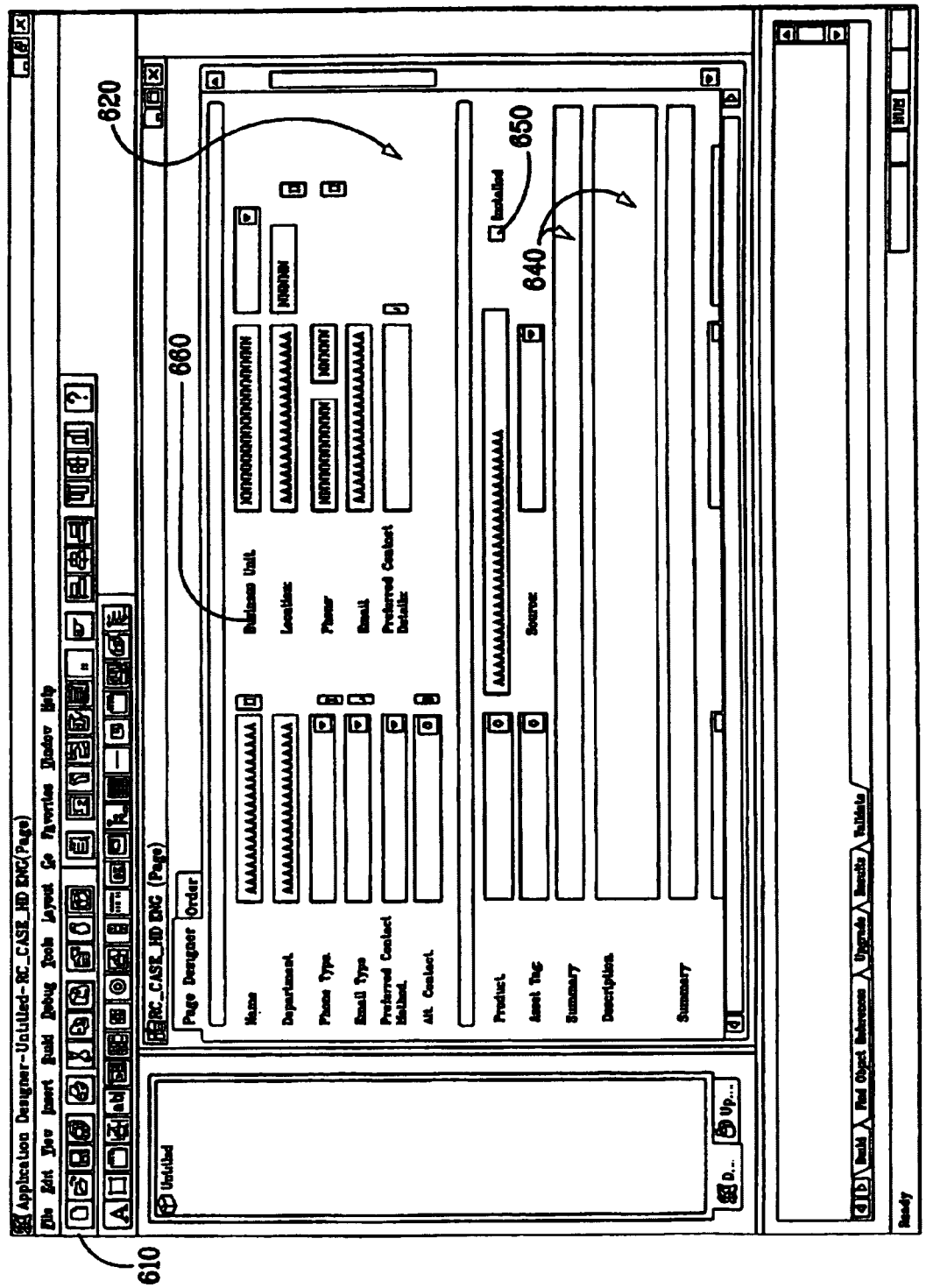
FIG. 6 illustrates an embodiment of an IDE.

FIG. 6 illustrates an embodiment of IDE 235 (FIG. 2) as used in page development step 100 (FIG. 1). The embodiment shown includes a new page button 610 and a user interface being developed 620. The user interface being developed 620 includes data entry fields 640, check boxes 650, and text elements 660. While the ability to position user interfaces elements such as these on a user interface is found in standard web development environments, IDE 235 includes features specific to the present invention. Following save page definition step 570 (FIG. 5), user interface being developed 620 may be presented to a user as an instance of application user interface 255.

Figure 7:
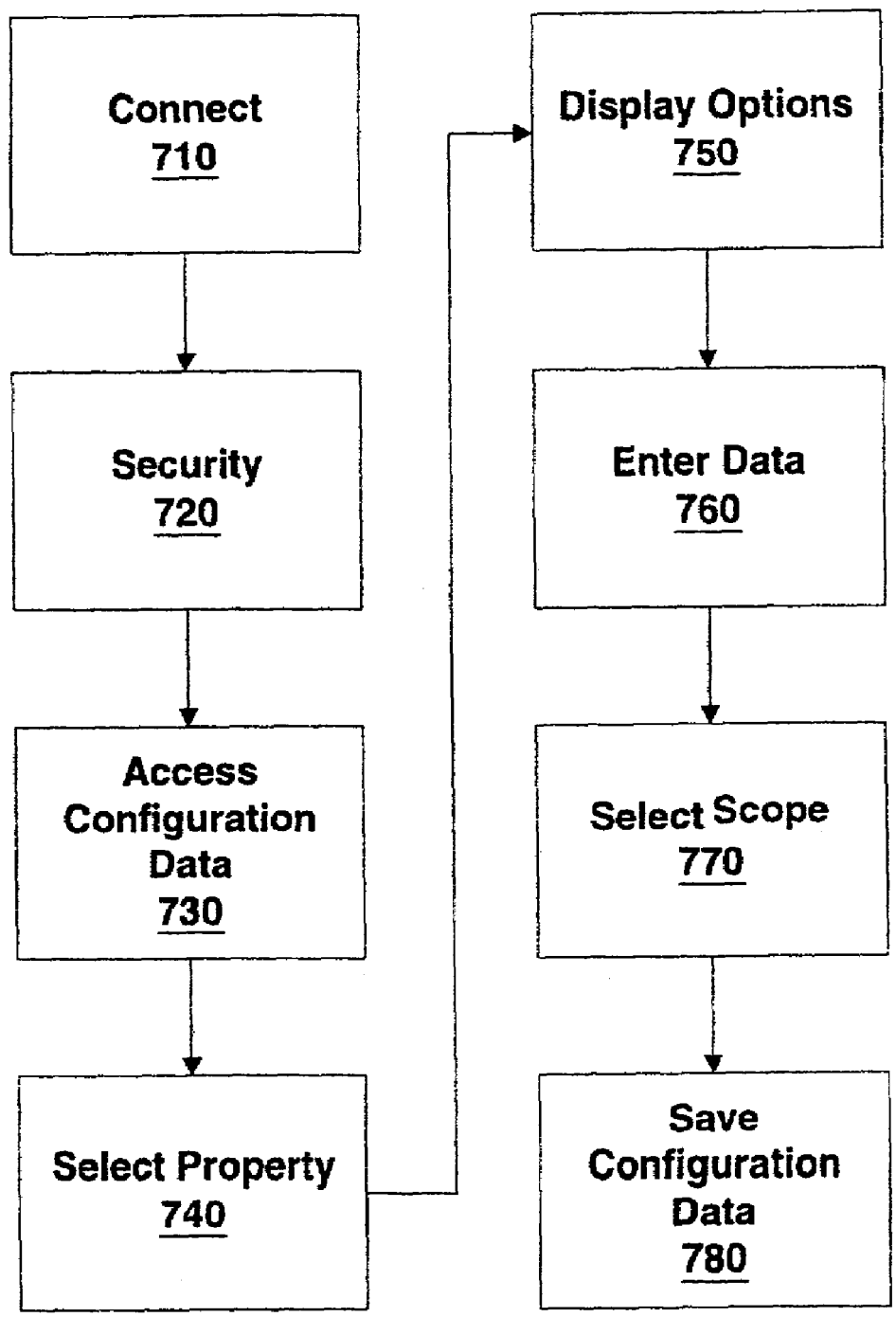
FIG. 7 illustrates one example of a configuration step in which a developed user interface is customized to meets the needs of a particular user or group of users.

FIG. 7 illustrates an example of configuration step 110 (FIG. 1) in which an application user interface 255 (FIG. 2) developed in step 100 is customized to meets the needs of a particular user or group of users. Configuration step 110 is initiated when an administrator, supervisor, or similarly privileged user connects to internet application system 250 (FIG. 2) in a connect step 710. This connection provides the privileged user access to configuration system 225. Permission to use configuration system 225 is optionally responsive to a security step 720 wherein the privileged user must pass a security protocol that establishes their identity and/or authorization and results in appropriate access privileges. In step 720 security manager 370 (FIG. 3) accesses optional directory server 375. Directory server 375 includes data such as usernames, passwords, privileges, and the like, that are used to authenticate users or clients and determine the privileges held by each. In alternative embodiments this information is saved in data repository 240 instead of directory server 375.

In an access configuration data step 730 the privileged user uses configuration system 225 to access configuration data 440 (FIG. 4) associated with an internet application. The ability to access and modify configuration data 440 is dependant on the specified privileges of a user. For example, in one embodiment a supervisor responsible for accounting department processes is only able to access application components related to this department.

In a select property step 740 the privileged user selects a property of the user interface element to customize. The selected property is a functional or static property that was made configurable during page development step 100 or element development step 50. The selected property is also, in various embodiments, specific to an entire internet application or to a part of an internet application such as an individual user interface element, a specific application user interface 255, an application component, or the like. For example, in one embodiment the selected property is static text to be displayed on a button whenever that button is used in an internet application. In another embodiment the selected property is specific to an application component and is a functional "immediate access" keystroke combination that will cause a cursor to move to a specific field.

In an optional display options step 750 the privileged user views one or more options available for the property selected in step 740. These options are typically determined during page development step 100 or element development step 50. For example, in one embodiment a developer specifies ten possible columns that can be included in a table. In this embodiment of step 750 descriptions of the ten possible columns are displayed to the privileged user as a list. By specifying limited configuration options, the developer can assure that configuration is restricted to reasonable choices.

In an enter data step 760 the privileged user selects one of the options displayed in step 750 or alternatively enters other data relating to the property selected in step 740. For example, in one embodiment the privileged user selects four of the ten possible columns displayed in step 750 to be included in a table. In an alternative embodiment, the privileged user enters a keystroke combination to be used for immediate access. The selection made in step 760 is reflected in a customized application user interface 255.

In an optional select scope step 770 the privileged user determines the scope of the selections made in steps 740 through 760. For example, in one embodiment the configuration is applied to only one user interface element on a specific user interface for a specific user. In an alternative embodiment the configuration is applied to all of an internet application (or applications) irrespective of user or client identity. In other embodiments scope is specified with respect to application components, individual user interfaces, particular groups of users, classes of user interface elements (field, button, image, etc.), and the like.

In a save configuration data step 780 the information generated in steps 740 through 770 is saved to DBMS server 245. As described further herein, this information is used in the generation of customized user interfaces, such as a customized application user interface 255.

Figure 8:
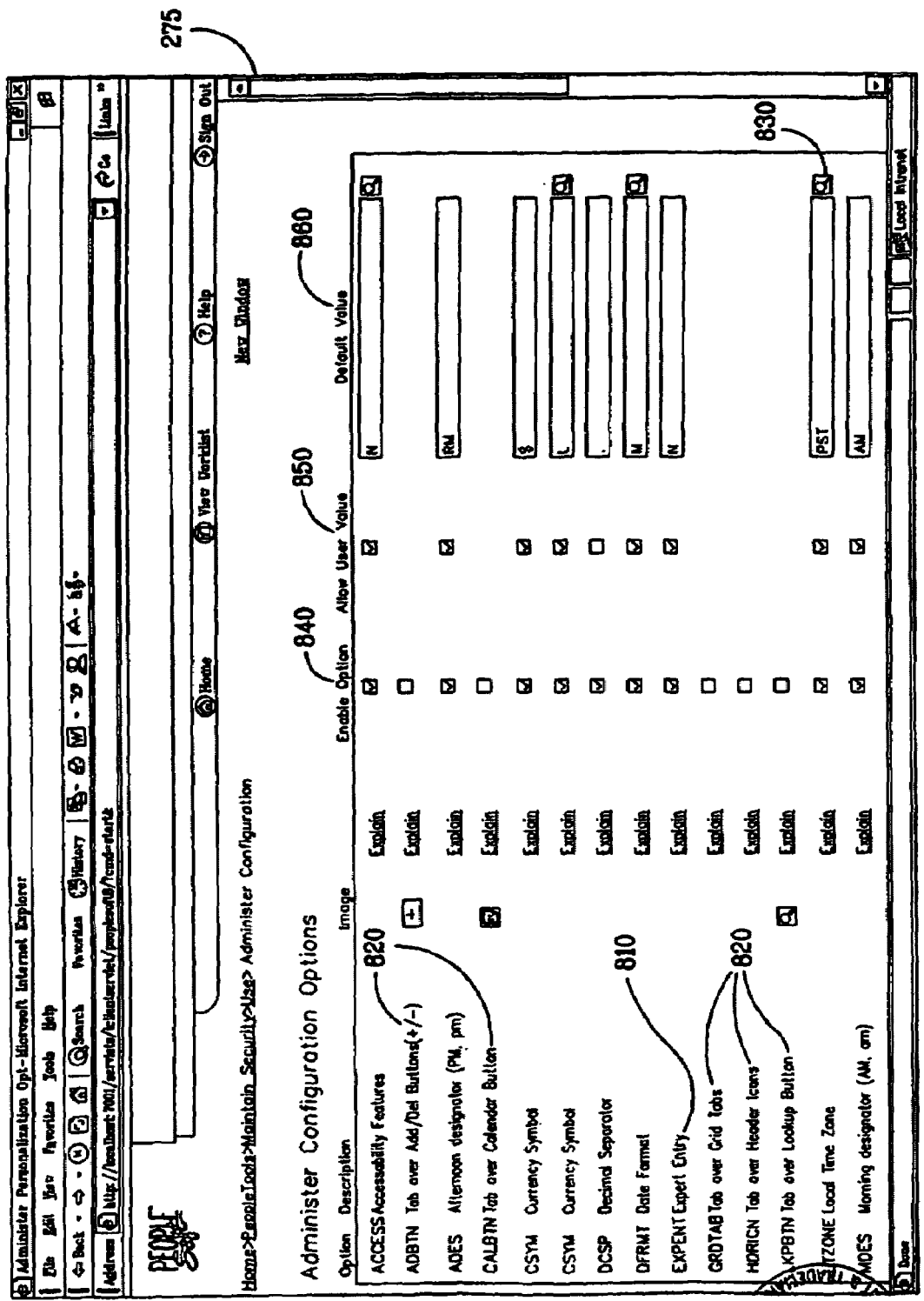
FIG. 8 illustrates an embodiment of a configuration interface.

FIG. 8 illustrates an embodiment of configuration interface 275 (FIG. 2) used by a privileged user to perform configuration step 110 (FIG. 1). The configuration options available in configuration interface 275 are determined by selections, such as specification of configurable properties of a user interface element, made in page development step 100. In this embodiment, configuration interface 275 includes rows associated with customizable properties such as an "expert entry" property 810 and various "tab" properties 820 as further described herein. Each property is further associated with an "enable option" checkbox 840 and an "allow user value" checkbox 850. The state of the enable option checkbox 840 determines whether an option is used. Similarly, the state of the allow user value checkbox 850 determines whether a user can enter their own (personalized) values for the option. Each property listed in configuration interface 275 is also associated with a default value 860. Magnifying glass buttons 830 are used to display lists of allowed values as explained in display options step 750 (FIG. 7).

Figure 9:
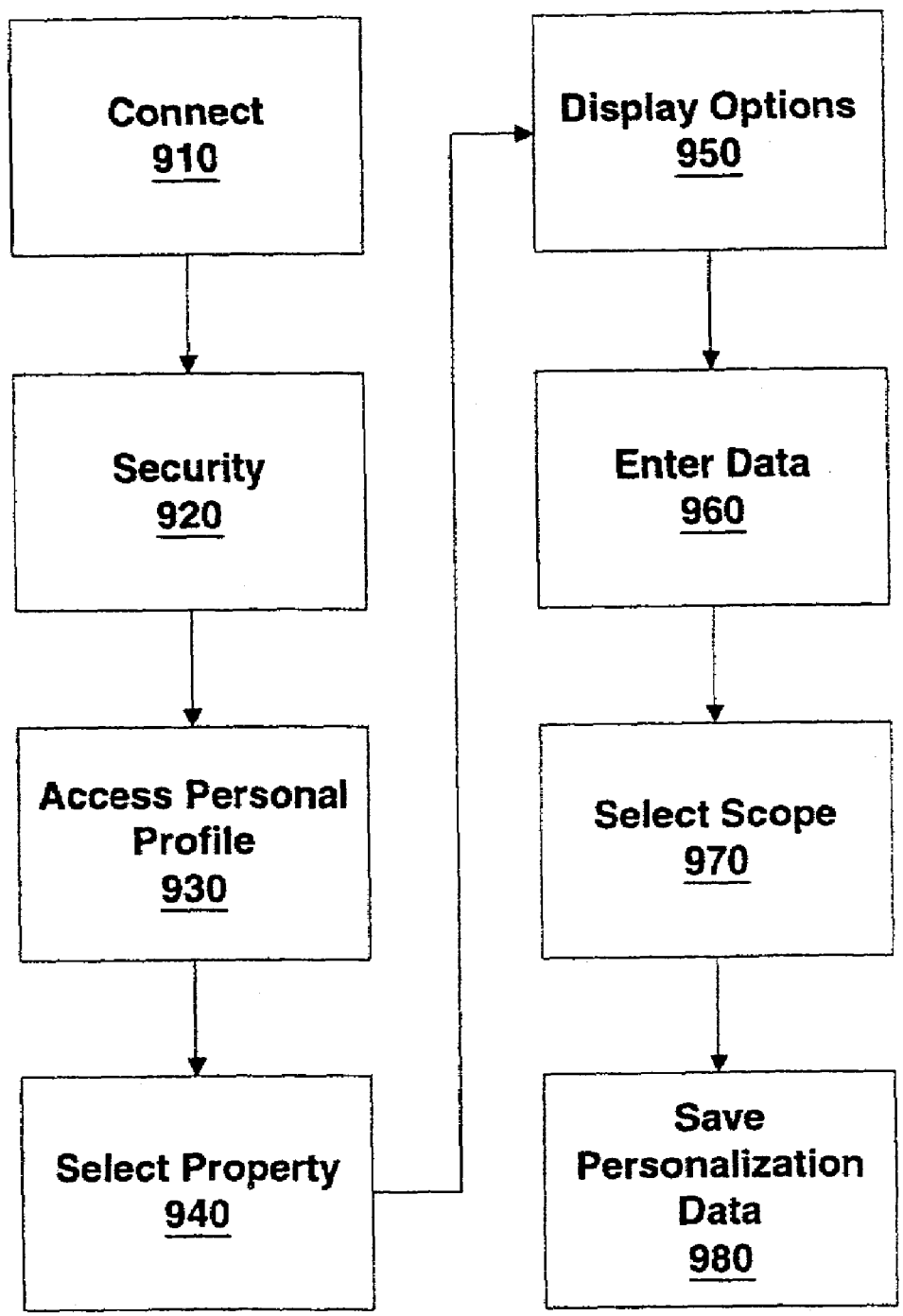
FIG. 9 illustrates details of a personalization step.

FIG. 9 illustrates details of personalization step 130 (FIG. 1) in which aspects of an internet application are personalized. In contrast with configuration, personalization is performed using personalization system 220 (FIG. 2) at the level of a single user and, therefore, typically affects only that user. Except for factors relating to these changes in customization level, steps 910 through 980 of FIG. 9 are similar to steps 710 through 780 of FIG. 7. For example, an optional security step 920 differs from security step 720 in that the permission required to access personalization settings of a single user is generally less than the permission required to modify the customization settings of multiple users. In a typical implementation each user has default permission to modify their own personalization settings.

In another example of difference between the steps of FIG. 7 and FIG. 9, access personal profile step 930 typically includes accessing the personal profile 450 (FIG. 4) of a user rather than configuration data 440. In one embodiment the properties available for modification in a select property step 940 and the options displayed in a display options step 950 are limited by the permissions held by the user. The data that a specific user is permitted to enter in an enter data step 960 may be similarly limited. In a select scope step 970 the allowed scope is typically limited to the current user and a save personalization data step 980 is optionally part of save step 140 (FIG. 1).

Figure 10A:
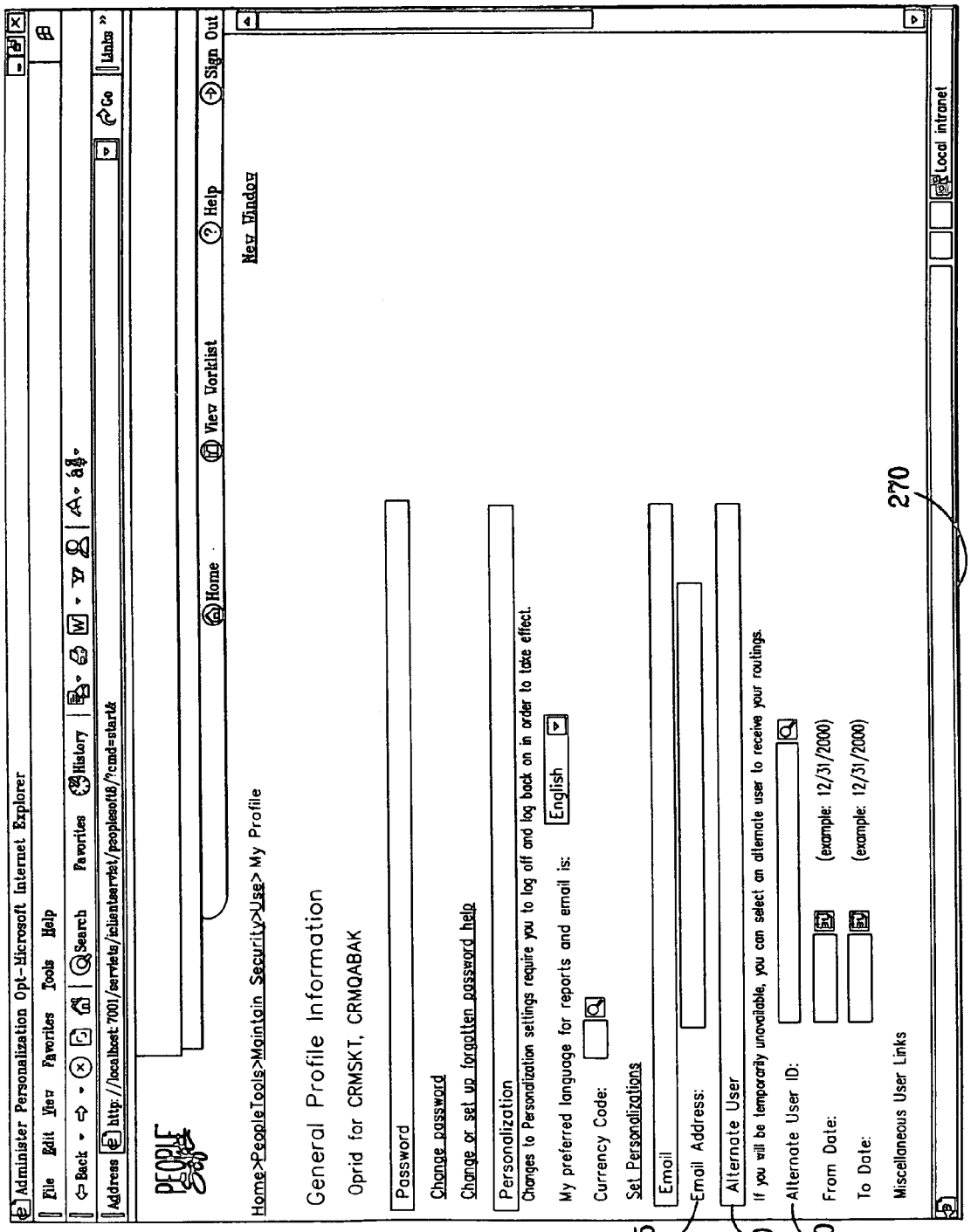
FIG. 10A illustrates an embodiment of a user profile interface.
Figure 10B:
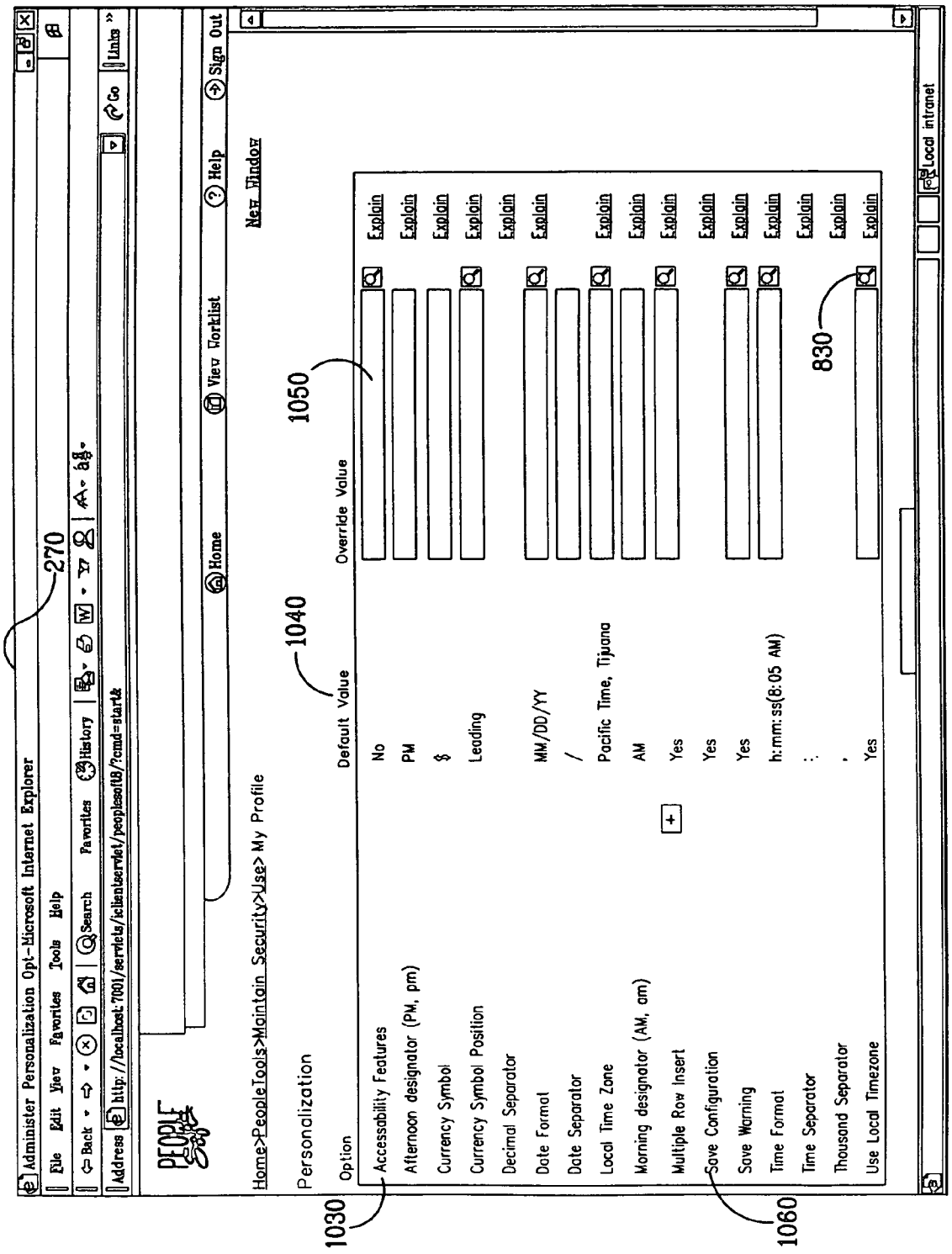
FIG. 10B illustrates another embodiment of the user profile interface.

FIGS. 10A and 10B illustrate two embodiments of user profile interface 270 (FIG. 2) that are used to perform personalization step 130 (FIG. 1). User profile interface is typically an embodiment of application user interface 255. The embodiment of user profile interface 270 illustrated in FIG. 10A includes facilities for changing general aspects, such as an e-mail address 1005 associated with a user. This embodiment also includes facilities for changing an alternate user property 1010 by providing an alternate user ID 1020. The embodiment of user profile interface 270 illustrated in FIG. 10B includes a table of customizable properties 1030, their default values 1040, and a field 1050 for entering personalized values.

Figure 11:
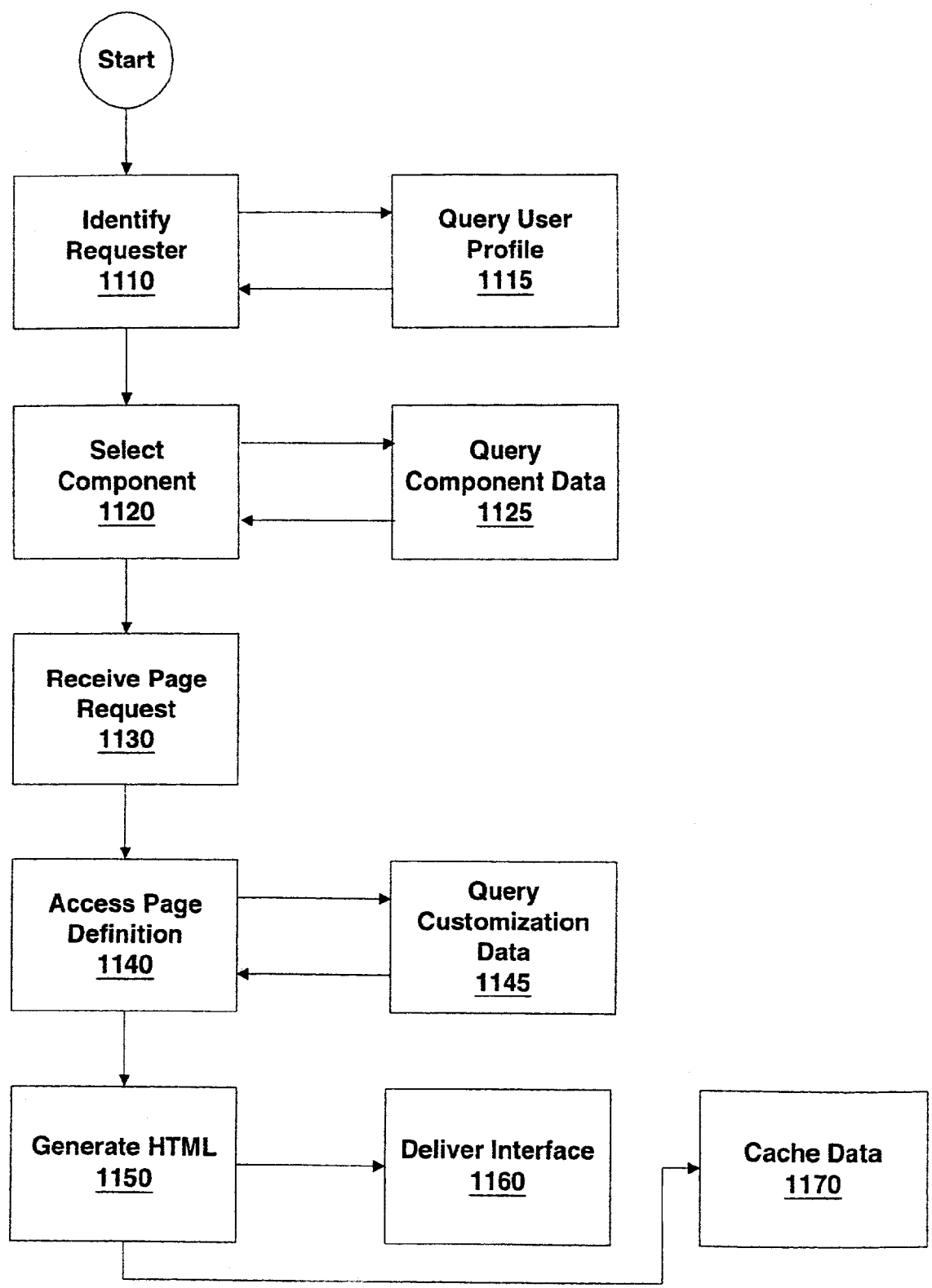
FIG. 11 illustrates examples of an initial presentation step and a presentation step.

FIG. 11 illustrates examples of initial presentation step 120 and presentation step 150 of FIG. 1. These steps both include generation of a customized user interface yet differ with respect to the availability of user modified personalization data 473 (FIG. 4). User modified personalization data 473 is available only after personalization step 130 and is therefore not always available during initial presentation step 120. Instances of customized application user interface 255 generated in steps 120 and 150 are delivered to a client for display to a user. The present invention anticipates that the steps illustrated by FIG. 11 are alternatively executed in a variety of sequences.

In an identify requester step 1110 a user initiates communication with internet execution system 215. Identification is optionally made with respect to a specific user, class of users, specific client or class of clients. The requester may be a specific external client, a human user or, in some embodiments, an external process. In various implementations identity is established through a user ID provided from the client, by accessing a standard browser cookie (or similar data) on the client, by virtue of an established secure session, or by a similar approach as is well known in the art. The identity established in step 1110 is used by other processes whose function is user or client dependent.

For example, the identification made in step 1110 is optionally used to perform a query user profile step 1115. In step 1115 information relating to the requestor is retrieved from user profile 450. Once retrieved this information is typically available for personalization of application user interface 255 until the current session between the requester and application execution system 215 is completed. In alternative embodiments query user profile step 1115 is performed as part of subsequent query operations, such as steps 1125 and 1145 discussed herein.

In a select component step 1120 the requestor selects one or more application components available through the current internet application. In some embodiments step 1120 is optional. For example, when only one application component is available or if all application components are to be made available. In some embodiments step 1120 is performed using a menu of application components.

Select component step 1120 may include an optional query component data step 1125. In step 1125 application component data 430 and/or configuration data is retrieved from data repository 240. Data retrieved in step 1125 may include all the metadata associated with each application user interface 255 associated with the application, metadata associated with components slected in step 1120, only page definitions relating to selected instances of application user interface 255, or some variation thereof. In alternative embodiments this data is collected during other query operations, such as step 1115 or step 1145.

In a receive page request step 1130 application execution system 215 receives a request for an instance of application user interface 255 from an external client such as web browser 310, wireless system 315, or external system 325 of FIG. 3. This request optionally includes a universal resource locator (URL) or similar locating information used to identify the particular application user interface 255 being requested. In some embodiments step 1130 includes a request for application data corresponding to values provided by the user. For example, step 1130 optionally includes search terms, keys or commands entered by a user in a field and used to retrieve application data. The search terms may be used as database keys that initiate the execution of processes related to the application component or are used to retrieve application data corresponding to the keys. Web application server 305 passes the page request to application server 309 that in turn initiates processes to fulfill the request. Receive page request step 1130 is typically performed each time the execution of the application component requires a new instance of application user interface 255.

Another process initiated by application server 309 performs an access page definition step 1140. Step 1140 is optionally performed prior to step 1130 and includes collection of information required to generate an instance of application user interface 255. The collected information includes data developed during page development steps 100 and 50 (FIG. 1) as well as data specifying customized properties such as configuration data 440 and personalization data 473. The collected data includes metadata defining characteristics of the instance of application user interface 255 and/or characteristics of individual user interface elements. The completion of step 1140 may be followed by execution of query customization data step 1145 wherein personalization data 473 or configuration data 440 is queried. Query customization data step 1145 is used to retrieve any additional data, such as configuration or personalization data, required to generate the application user interface 255.

In a generate HTML step 1150 application server 309 uses the metadata and other information collected to generate HTML. User Interface Generator 340 generates HTML by interpreting the metadata and using data collected from data repository 240 as required. Generate HTML step 1150 is concluded when references to required data are resolved and the data required to display a customized application user interface 255 is generated. This data optionally includes browser compatible formats such as JavaScript, HTML, WAP, and the like. Resulting valid HTML constructs are serialized, optionally packaged as a web page, and delivered to the client in deliver interface step 1160. Incorporation of personalization data 473 and/or configuration data 440 in the HTML results in an instance of application user interface 255 personalized or configured according to the wishes of a user. This instance optionally includes JavaScript or other data compatible with a standard (unmodified) web browser. Steps 1130 through 1160 are typically performed one or more times during the execution of an application component.

Metadata relating to specific user interface elements optionally specifies personalized or configured aspects of the requested page. In these cases relevant values from the customization data collected in the above steps are used in generate HTML step 1150. For example, in one embodiment a required user interface element is a button and user interface generator 340 uses personalization data associated with tab-over to decide whether the button should be included in the tab-order. In another embodiment the use interface element includes run time processing, such as when an application developer has specified that an expert entry mode is allowed. In this case user interface generator 340 uses personalization data specific to an individual user to generate responsive HTML and JavaScript.

In alternative embodiments the metadata includes or is used to construct a value or a reference, such as a pointer, URL, or a query, to another location. This may include a numerical value, such as a font size, or alternatively include more complicated data such as a segment of JavaScript or an e-mail address. This may also refer to, and be used to access, data records within configuration data 440, personalization data 473, directory server 375, or other aspects of Data Repository 240. Data records within configuration data 440 and personalization data 473 include supervisor or user modified information that becomes incorporated in a customized application user interface 255 delivered to the requester.

Access page definition step 1140, generate HTML step 1150 and the use of metadata are further illustrated by the following examples. In one embodiment of step 1140 a requested user interface includes a configurable user interface element with a user customizable text property (e.g., string or format) used to label the configurable user interface element. Application server 309 accesses a user interface definition related to the requested application user interface 255 that was developed in page development step 100 (FIG. 1). The user interface definition is retrieved during steps 1125 or 1145 and includes a specification indicating where on application user interface 255 the customizable user interface element should be located. The user interface definition also includes a reference to a data location where the text property of the configurable user interface element may be found.

A customized application user interface 255 optionally includes a number of configurable user interface elements, each further including a number of configurable properties. Data required to generate individual user interface elements is optionally collected at different times, even when the user interface elements are included in the same instance of application user interface 255. For example, in one embodiment the customizable order of columns in a table are determined when the application component using the table is selected in step 1120. In an alternative embodiment the order is determined when the information is first required in an instance of step 1140. Data relating to user interface elements responsive to the run time requirements of the application component, such as those including JavaScript, are typically collected in step 1145 shortly prior to generate HTML step 1150. The HTML and/or JavaScript generated in step 1150 is delivered to a client in deliver interface step 1160.

Once the HTML or JavaScript defining a user interface element is generated the generated data is optionally cached in a cache data step 1170. When possible the cached data is retrieved when the user interface element is next required. Retrieving a cached copy prevents unnecessary repetition of generate HTML step 1150. In addition, cache data step 1170 may include storage of other static aspects of the generated application user interface 255, such as page definitions, style sheets, images, and JavaScript.

The user interface generation process optionally operates independently from the type of data stored within DBMS Server 245 and the number of query operations required to generate a requested page. This independence enables the inclusion of references to customization data, such as configuration data 440 and personalization data 473, and inclusion of this data in the generated application user interface 255, without modification of the user interface design developed in page development step 100. The ability to include customized data without modifying page design is thereby achieved in an HTML/JavaScript interface supported by a standard browser.

An alternative embodiment includes multiple and/or recursive execution of query steps 1115, 1125 or 1145. Through the use of multiple query steps multiple levels of configuration and personalization are possible. For example, in one embodiment the result of a query step includes further metadata requiring a subsequent query to retrieve further data.

Steps 1125 and 1145 optionally use the requester identity determined in step 1110 to determine permissions and develop appropriate queries. For example, requester identity is used to determine which personalization data 473 to query and to resolve configuration data 440 whose scope is user dependent. In many instances the requestor identity is included as a parameter in a query.

Embodiments of the invention include configuration of user interface properties that include keystroke functionality. This allows users or supervisors to modify the response of user interface elements to keystroke combinations. Examples of keystroke configuration include customization of "tab-order," "tab-over," "hotkey," and "immediate access key" functionality.

Tab-order functionality determines the order in which the tab key changes "focus" among user interface elements. With respect to application user interface 255, the "focus" is the user interface element on which the cursor rests or to which action is directed. For text entry fields focus is usually indicated by the presence of a text cursor or highlighting of the text entry field. For buttons, other graphical objects and links the focus is typically indicated by a dotted line highlighting the object. Tab-order is typically determined by the sequential order in which elements are placed on a user interface or by the order of an original web page design. Customization of tab-order includes altering this default order. For example, in one embodiment the tab-order is changed to match the order in which data is preferably added to a form.

Tab-over is a particular case of tab-order that allows a user interface designer, supervisor, or user to indicate that certain user interface elements should be skipped in the tab-order. For example, a user can personalize an application component such that the tab-order ignores all buttons and graphic objects, stopping only at text entry fields where the user wishes to enter data. Alternatively, application user interface 255 is optionally customized such that the tab-order only includes text entry fields and a "next" button that is used to request the next required user interface.

A hotkey is a keystroke combination that results in the execution of an operation. For example, the Ctrl-C keystroke combination is often used to copy something to an electronic clipboard. Likewise, the Ctrl-S keystroke combination is often used to execute a "save" command. The inclusion of hotkeys in an internet application greatly increases the utility of the application. For example, including a Ctrl-N keystroke combination to automatically request the next page in an application component. In further examples, the Ctrl-K keystroke combination is optionally customized to display a help screen containing information relating to the user interface element with the current focus and Ctrl-5 is optionally customized to prompt a user for input. Hotkeys are generally used to save the user the trouble of using a pointing device to move a cursor to a graphical button, a potentially time-wasting action for an experienced user. Because hotkeys can have different meanings in various environments and to different users it is helpful for a user to be able to customize the hotkeys associated with an internet application. For example, the Ctrl-N keystroke sequence will cause the Microsoft Internet Explorer® browser, in its standard configuration, to reload the existing page. Thus, this sequence would be a poor choice for requesting the next page when using this browser. Since hotkeys are either not available or not standardized in browser environments it is an important aspect of portability to be able to configure these keystroke combinations such that conflicts found in the different environments can be avoided.

Immediate access key functionality allows the focus on an application user interface 255 (FIG. 2) to be directed to a specific user interface element associated with an immediate access keystroke combination. For example, in one embodiment an immediate access keystroke combination is used to place a text cursor in a specific text entry field. The focus is changed to this text entry field upon typing of the immediate access keystroke, regardless of the prior focus location. Hotkey keystroke sequences are a type of immediate access keystroke sequence.

Figure 12:
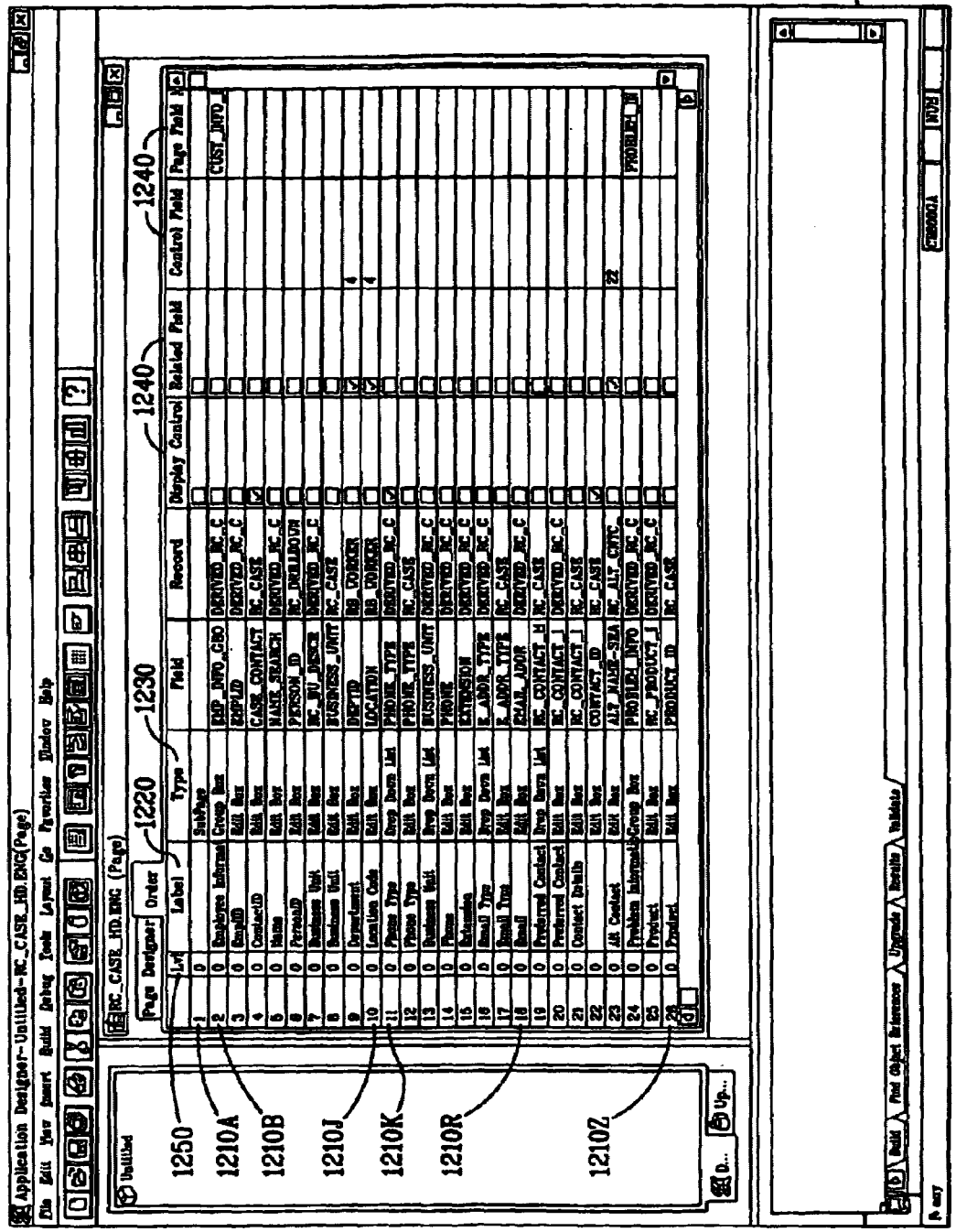
FIG. 12 illustrates a tab-order interface used for specifying tab-order.

FIG. 12 illustrates a tab-order interface 1200 used for specifying tab-order, and found in various embodiments of IDE 235 and, optionally, configuration interface 275. Tab-order interface 1200 includes a row 1210A–1210R for each user interface element on an associated application user interface 255. The columns of tab-order interface 1200 include a label 1220 identifying the user interface element and a user interface element type 1230, such as "EDIT BOX" or "DROP DOWN LIST," that describes a class of the user interface element. The columns also include various user interface element control settings 1240, and a user interface element level 1250. These entries are used to establish relationships and interdependencies between user interface elements. The tab-order is determined by the order of rows 1210, and optionally the level 1250 value or a control setting 1240. For example, in one embodiment the user interface element associated with row 1210J will be followed by the user interface element associated with row 1210K in the tab-order. Customization is accomplished by changing the order of the rows 1210. A similar interface is used to customize other keystroke functionality.

The row 1210A–1210R order illustrated in FIG. 12 is used during save page definition step 570 (FIG. 5) to generate metadata. This metadata references information about the tab order of various user interface elements, which in turn are used by components on application server 309 to generate the appropriate HTML code. Specifically, the metadata optionally includes either an appropriate value for a TABINDEX attribute of various user interface elements within the user interface, or includes JavaScript that "traps" the tab key when the focus is on the last object to which the user wishes to tab. This JavaScript is used to move the focus from the last object back to the first object. TABINDEX is an HTML parameter introduced in recent HTML standards and used to specify tab-order. The configuration of other aspects of keystroke functionality makes similar use of JavaScript or HTML keywords.

Figure 13A:
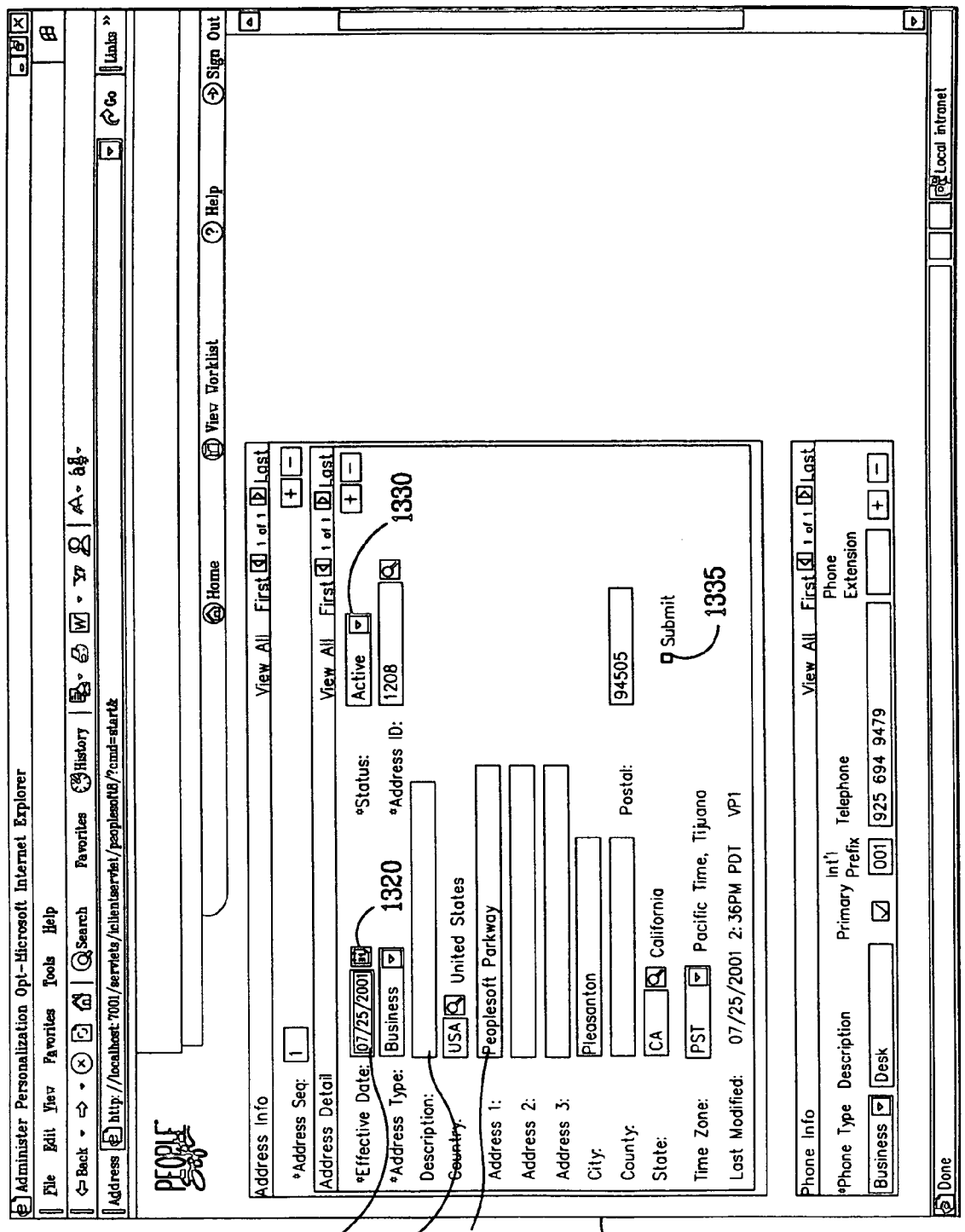
FIG. 13A illustrates an address entry form, such as may be found in an order entry application component.
Figure 13B:
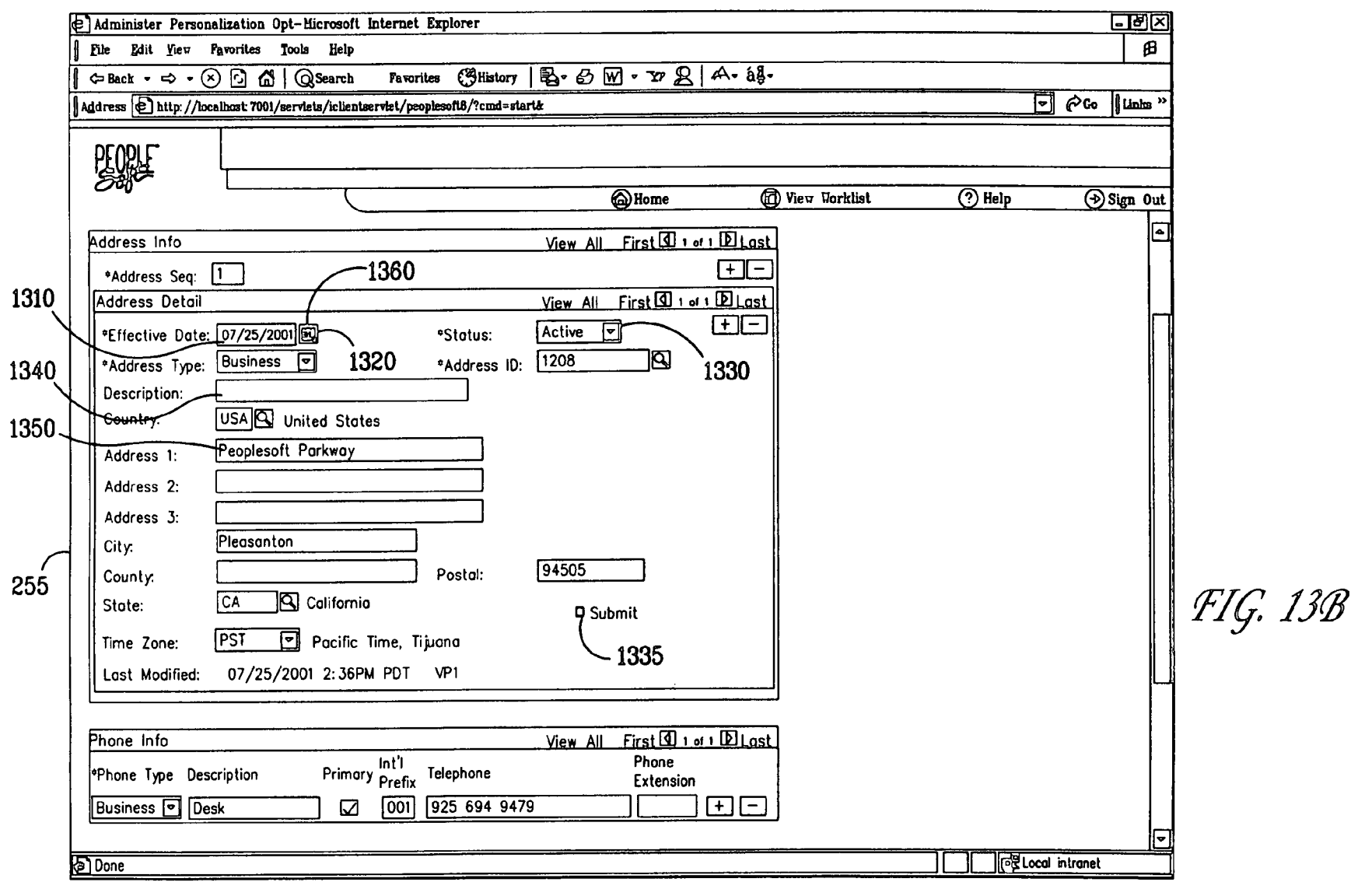
Figure 13D:
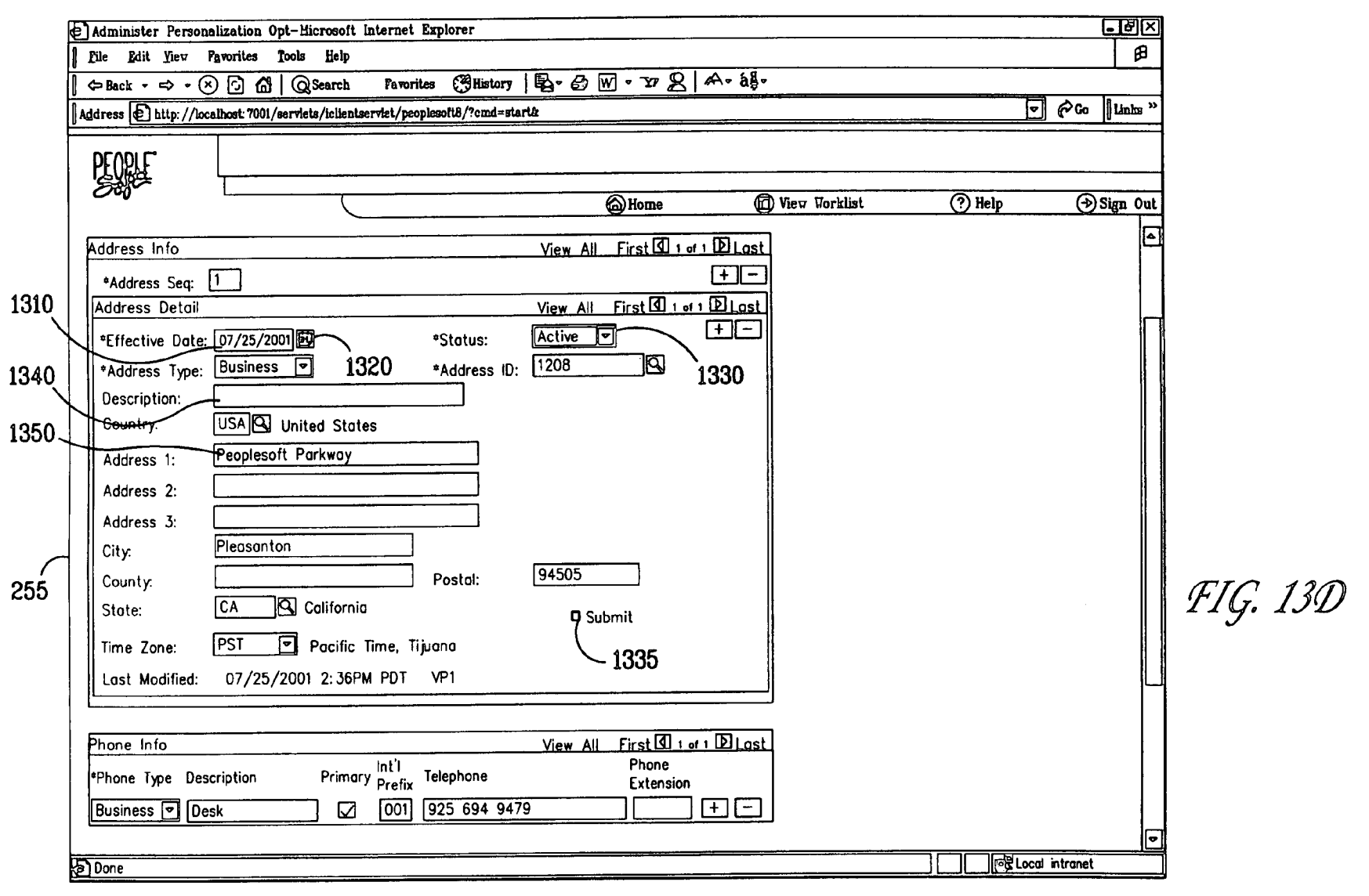

FIGS. 13A through 13E illustrate customization of keystroke functionality in an embodiment of application user interface 255. FIG. 13A illustrates an address entry form, such as may be found in an order entry or customer management application component. The address entry form includes a date field 1310, a calendar button 1320, a "Status" drop down list 1330, a submit check box 1335, a description field 1340 and an "Address" field 1350 among others. In FIG. 13A the focus is on date field 1310 as indicated by the highlighting. By default, pressing the tab key moves the focus to calendar button 1320, as illustrated in FIG. 13B. FIG. 13C is an expanded view of a portion of FIG. 13B showing detail of a dotted line 1360 that indicates the presence of the focus on calendar button 1320. Pressing the tab key again moves the focus to status drop down list 1330, as shown in FIG. 13D. In one instance of tab-order configuration, the tab-order is changed such that the first pressing of the tab key moves the focus from the date field 1310 (as shown in FIG. 13A) to the status drop down list 1330 (as shown in FIG. 13D) and the second pressing of the tab key moves the focus from the status drop down list 1330 to description field 1340.

Figure 13E:
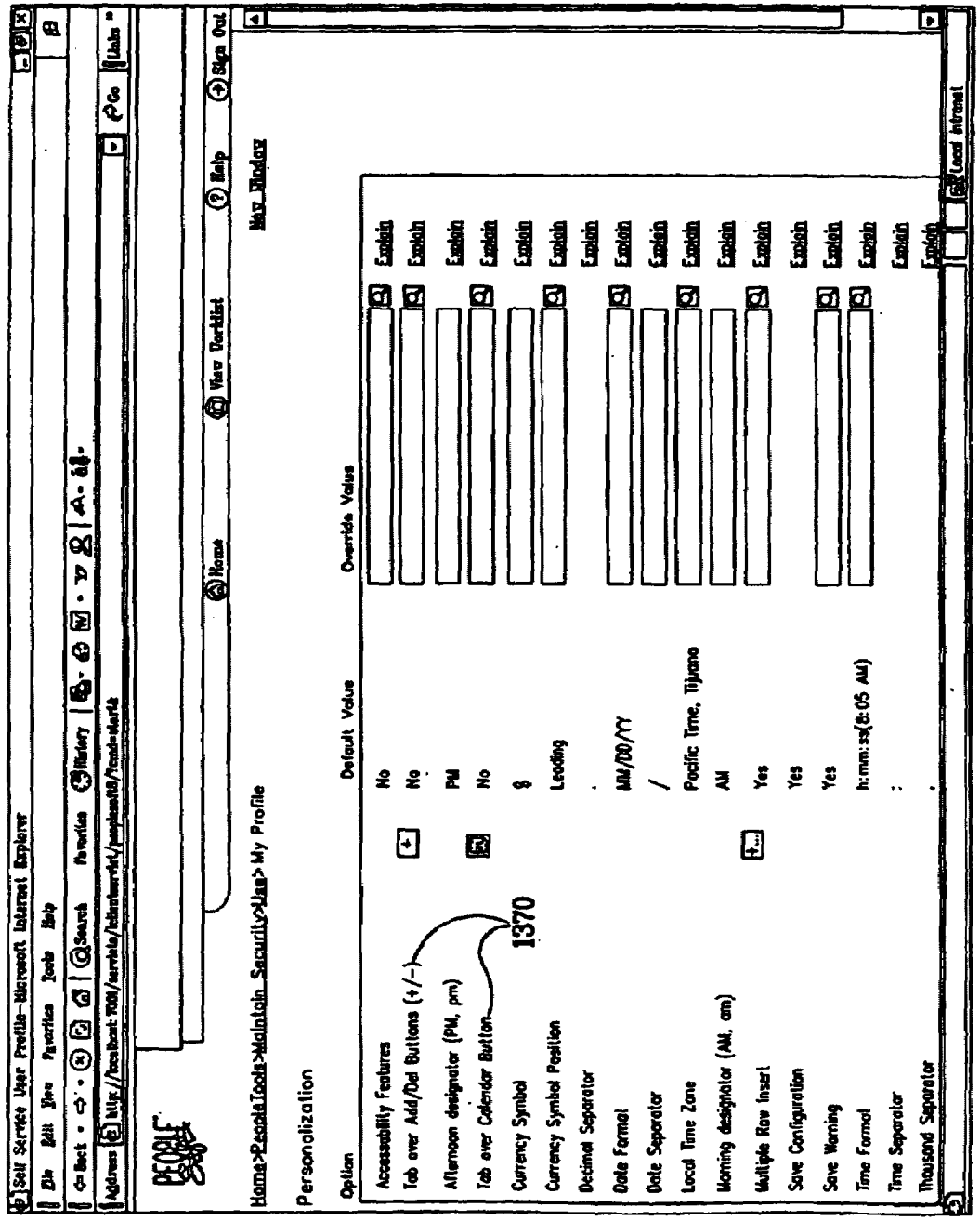
FIG. 13E illustrates an embodiment of a user profile interface including two options relating to tab-over.

In one embodiment of tab-over customization, all button objects, such as calendar button 1320, are skipped in the tab-order. In this instance pressing the tab key for the first time moves the focus from the date field 1310, as shown in FIG. 13A, directly to status drop down list 1330, as illustrated in FIG. 13C. Using tab-over customization to skip calendar button 1320 in the tab-order reduces the number of keystrokes required for a consistent user to enter data in the address entry form. As with other tab-order customization, an individual user can typically turn on and off a button object skipping feature. FIG. 13E illustrates an embodiment of user profile interface 270 that includes two options 1370 relating to tab-over functionality.

Immediate-access keys and hotkeys are customized using methods similar to those used for customization of tab-over functionality. For example, in one instance of an order entry application component, a user interface element is configured to respond to a Ctrl-D hotkey combination by changing the state of submit checkbox 1335 (FIG. 13A) and generating a request for the next application user interface 255 (FIG. 2). In this instance JavaScript designed to handle the Ctrl-D key combination is generated using configuration data 440 (FIG. 4) and/or personalization data 473 along with the metadata associated with customized application user interface 255. Through a similar approach, a Ctrl-T immediate-access keystroke combination may be designated to change the focus from any other element to address field 1350.

The present invention provides significant customization of the ways in which data is presented to a user and the ways a user can interact with an application. For example, in one embodiment the stylistic properties of tables (grids) are customized. These stylistic properties include column titles, column widths, and similar aspects. In some embodiments customization of tables includes column order, sorting by a specific column, display of selected columns, and determination of the number of rows and/or columns to display.

Figure 14A:
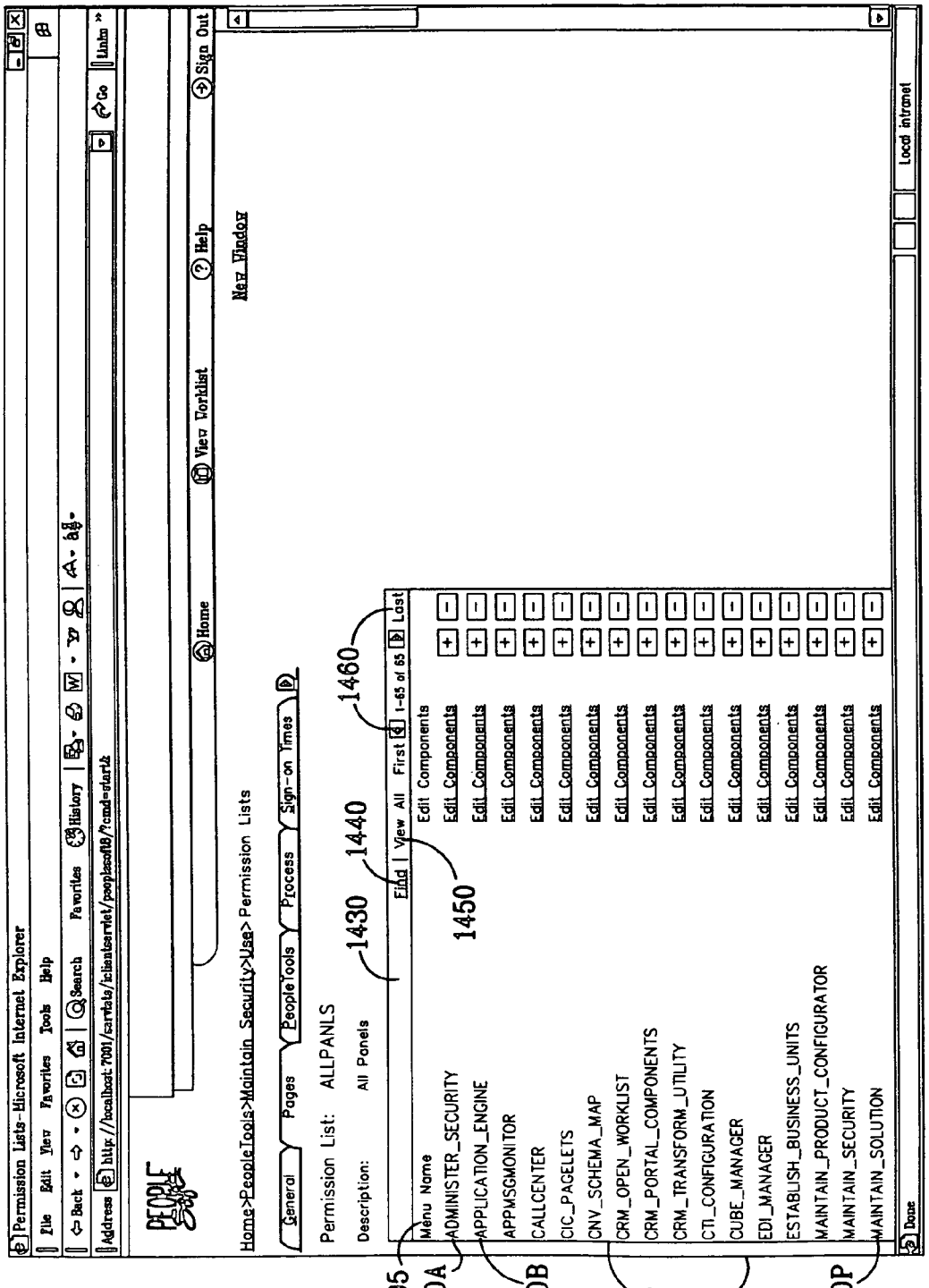
FIG. 14A illustrates an embodiment of an application user interface including a table showing the results of a query.

FIG. 14A illustrates an embodiment of application user interface 255 (FIG. 2) including a table 1410 showing the results of a query. Table 1410 includes multiple data rows 1420A–1420P and a customized menu bar 1430 with find command 1440, view all command 1450, and other navigation commands 1460 associated with the table. The commands included in customized menu bar 1430 are optionally selected using configuration interface 275. Menu bar 1430 is an example of an application component typically found in a library of application components accessed in step 50 (FIG. 1). The number of rows 1420 shown on a single application user interface 255 is customizable. Since the number of rows in a table 1410 is often more than is convenient to display on a single user interface, the table 1410 may be distributed across several application user interfaces 255. Navigation between these user interfaces is accomplished using navigation commands 1460.

Figure 14B:
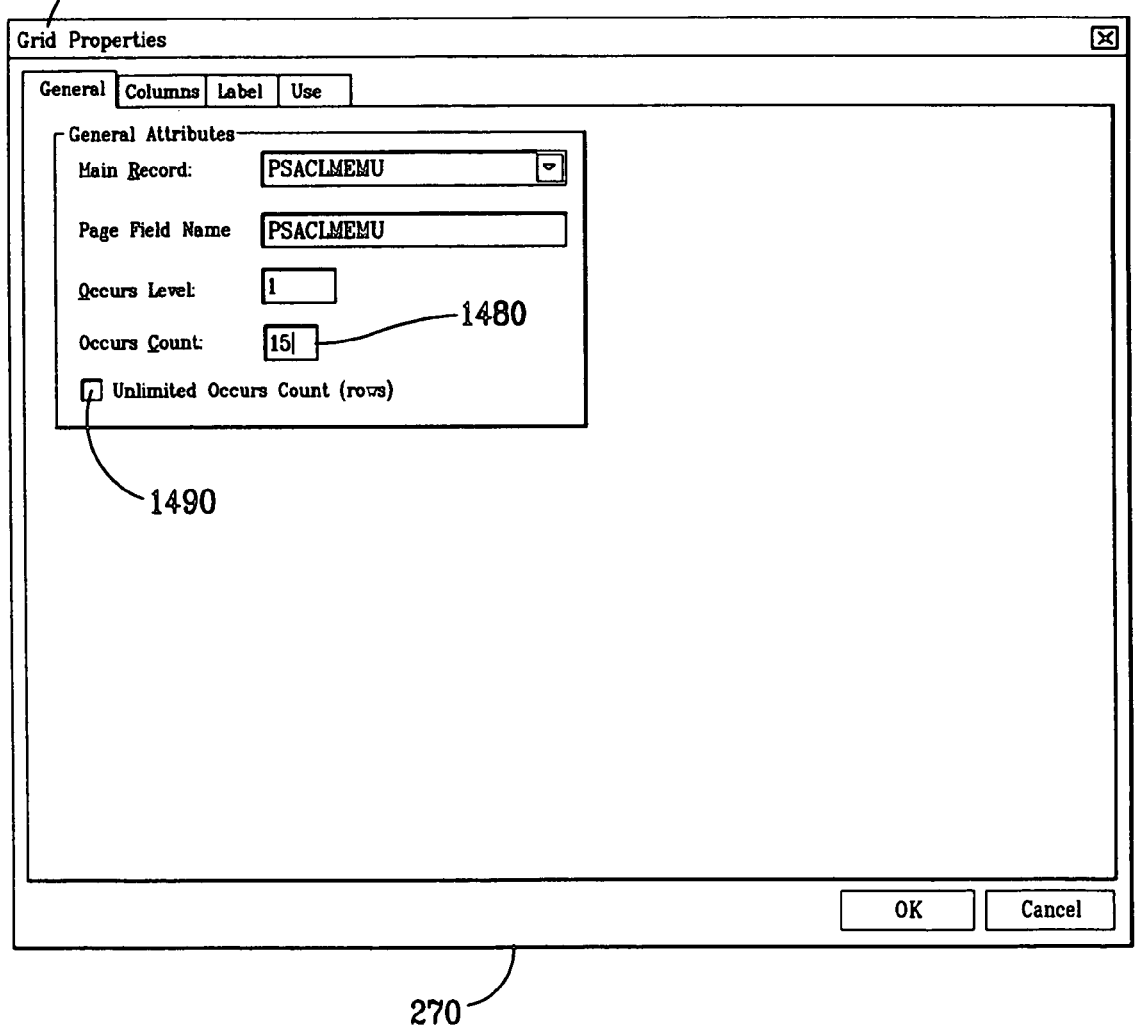
FIG. 14B illustrates an interface that is included in various embodiments of the IDE.

FIG. 14B illustrates an interface 1470 that is included in various embodiments of IDE 235, configuration interface 275, and user profile interface 270. Interface 1470 includes an occurs count field 1480 whose value determines the maximum number of rows 1420 displayed in an instance of application user interface 255. Interface 1470 also includes an unlimited occurs checkbox 1490. If this box is checked all available rows 1420 will be displayed on one application user interface 255 when the data is displayed. The configuration of table 1410 specified using interface 1470 is retained and used when application user interface 255 is revisited. Thus, a state of the customizable view all command persists between the present and any subsequent uses of application user interface 255.

The View All command 1450 (FIG. 14A) is a default aspect of menu bar 1430 when all rows 1420 in table 1410 are not visible in a single instance of application user interface 255 and instead are distributed over several instances of application user interface 255. FIG. 14C illustrates the result of executing the View All command. In this instance all of rows 1420 in table 1410 are shown in a single application user interface 255. These include rows, such as row 1420Q, not shown in the instance of application user interface 225 illustrated in FIG. 14A.

The number of rows 1420 (or columns) visible in an embodiment of application user interface 225 is resolved in presentation step 150 (FIG. 1). In step 150 application server 309 has access to all rows 1420 and a value is retrieved from DBMS server 245 to determine which of rows 1420 should be displayed in a particular instance of table 1410. This value is optionally retrieved from configuration data 440 or personalization data 473. In a typical embodiment all rows 1420 are temporarily cached in web application server 305 for immediate access.

The find command 1440 of menu bar 1430 (FIG. 14A) takes advantage of the access that application server 309 has to all rows 1420. Since this information is available, even though not displayed, the find command can search across all rows, including those that are not shown in the current interface 225. For example, in one embodiment a query returns a list of 100 results and occurs count field 1480 (FIG. 14B) is set to 20. When the results are returned, the first 20 rows 1420 are shown in table 1410. A user can use find command 1440 to search all 100 rows returned by the query, even if all results are not displayed on the current user interface. If the find command 1440 locates a result that is not shown in the current table 1410 a new application user interface 225 is generated that includes a new table 1410 with the found record. The find operation typically operates on the copy of all rows 1420 cached in web application server 305. The scope over which find command 1440 searches is user customizable. A user may choose to search over all rows, a fixed number of rows or only those rows displayed.

An optional sort operation takes advantage of the copy of all rows 1420 cached in DBMS server 245 in a manner similar to find command 1440. For example, in one embodiment of table 1410 a column heading 1495 is selected to display rows 1420 sorted by that column. The invention is able to perform this sort and display a new instance of table 1410 quickly by using the cached copy that includes all rows 1420.

An embodiment of the invention includes customization of the interaction models used for communication between internet application system 250 and the client displaying application user interface 255. These communications include complete delivery of user interfaces, web pages, user input from the client, and other messages between the client and web application server 305.

Figure 15:
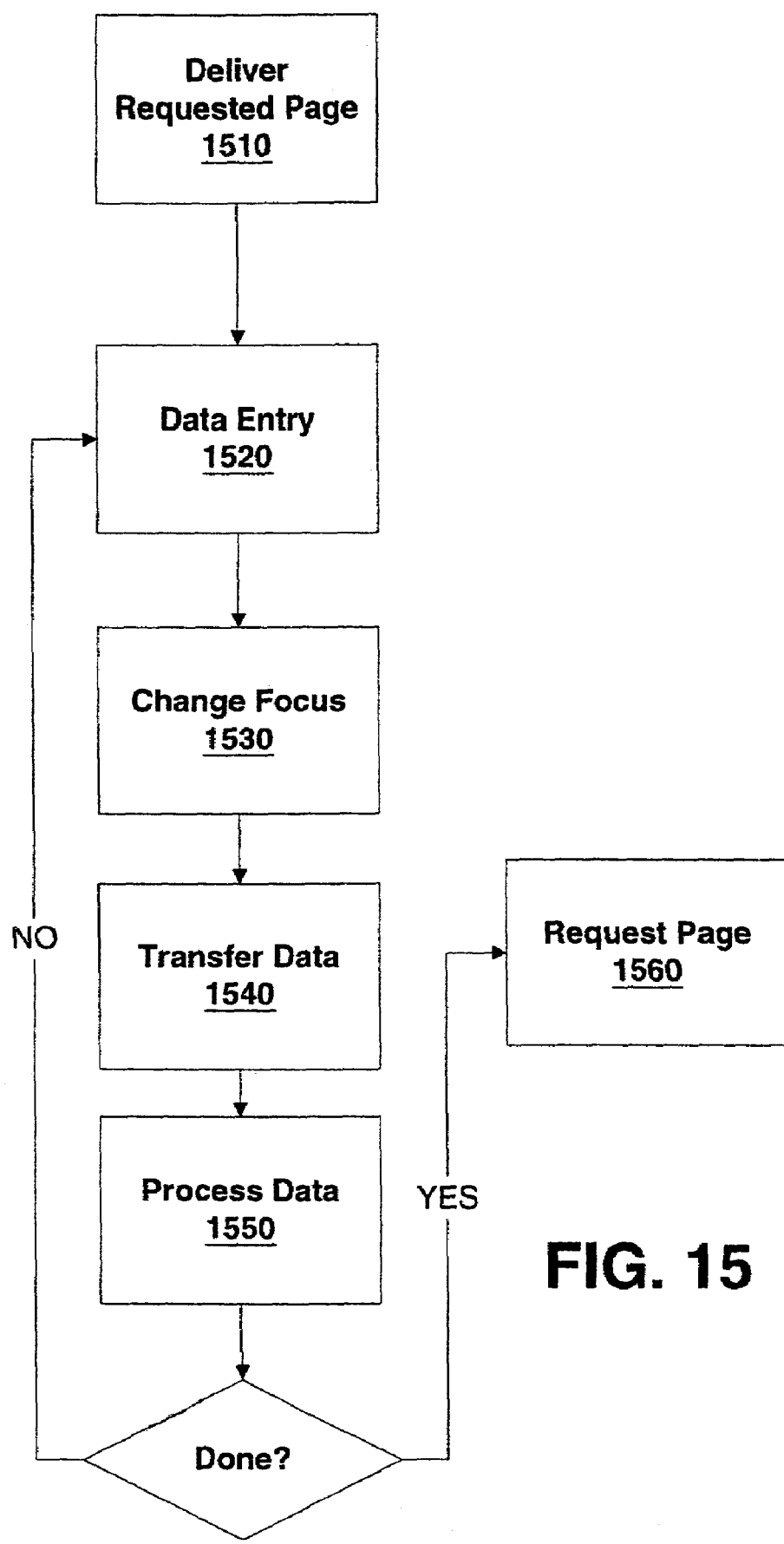
FIG. 15 illustrates an interaction model wherein data entered by a user is immediately transferred to the internet application system.

FIG. 15 illustrates one interaction model wherein data entered by a user is immediately transferred to internet application system 250. In a deliver requested page step 1510 application user interface 255 is delivered to the client. This application user interface 255 includes data entry elements such as text entry fields, check boxes, radio buttons, and the like. In a data entry step 1520 a user enters data into one of the data entry elements. This data entry includes entering text, changing a check box or radio button, or the like. In a change focus step 1530 the focus on the current user interface is changed to a user interface element other than the one used for data entry in step 1520. The change of focus indicates that data entry step 1520 is completed. In a transfer data step 1540 the user-entered data is transferred, using standard network protocols, to internet application system 250. In an optional process data step 1550 the transferred data is processed by internet application system 250. This processing includes actions such as range checking, delivery to application engine program 440, authentication, and the like. The processing optionally results in a response from internet application system 250 that is returned to application user interface 255. For example, if a value entered by a user is outside of an allowed range, an error message can be generated and sent to application user interface 255. Communication between application user interface 255, internet application system 250, and application server 309 can take a significant amount of time, thus slowing the data entry processes. Typically the page delivered in step 1510 includes several data entry elements. The steps 1520 through 1550 are repeated for each element until the data entry process is completed. If data entry is complete then a new page is requested in an optional request page step 1560.

Figure 16:
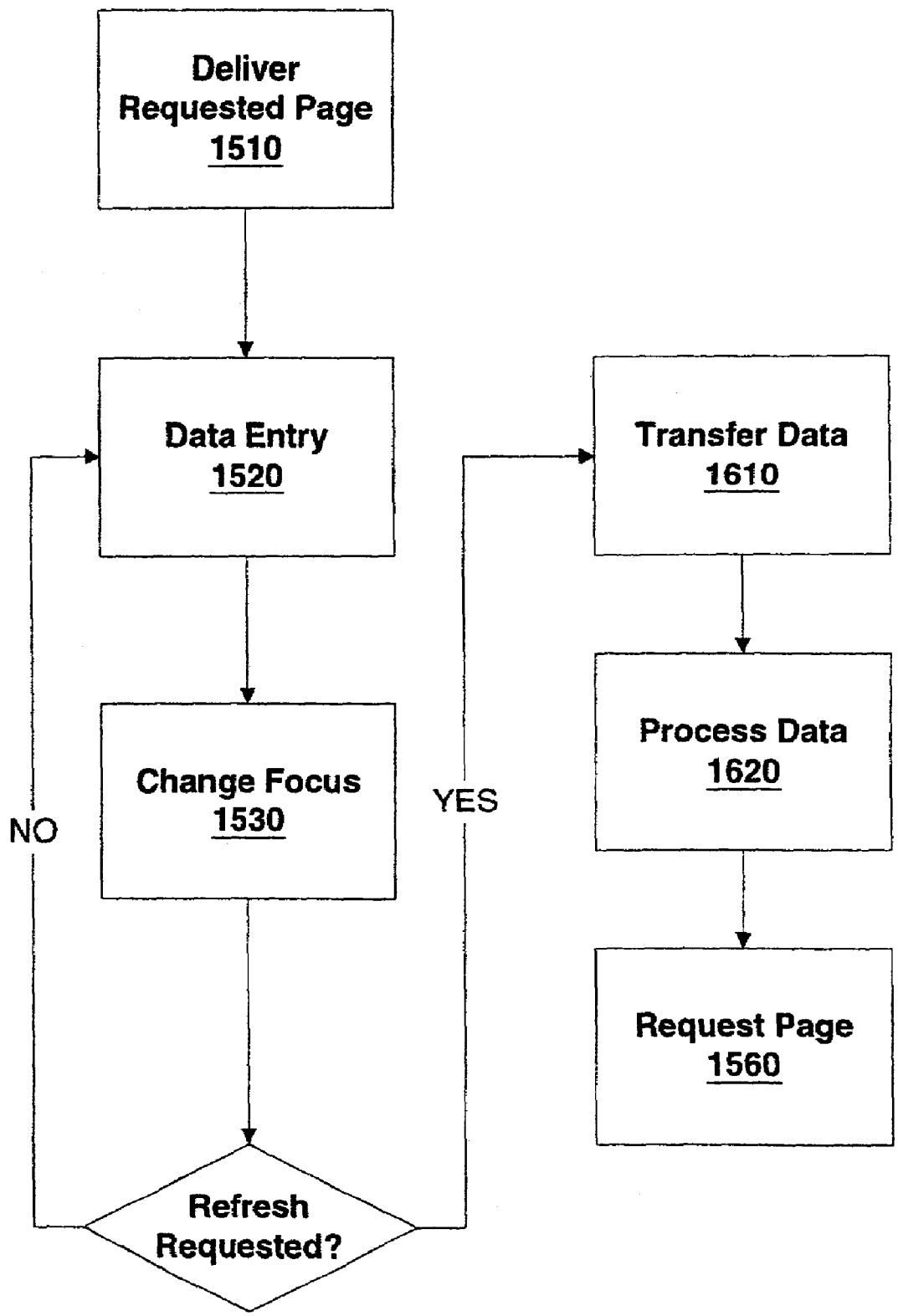
FIG. 16 illustrates an interaction model wherein communication between an application user interface and an internet application system is delayed.

FIG. 16 illustrates an alternative interaction model wherein communication between application user interface 255 and internet application system 250 is deferred. In this model steps 1510 through 1530 are performed in a manner analogous to the steps illustrated in FIG. 15. After change focus step 1530 the process returns to step 1520 unless a refresh has been requested. A refresh is specifically requested by a user, for example, by clicking a "refresh" button. A refresh is also initiated when a user requests a new user interface or when a user completes entering data in a user interface element or application component incorporating the interaction model illustrated in FIG. 15. User interface elements on a single instance of application user interface 255 optionally use different interaction models. If a refresh request is received then data is transferred between application user interface 255 and internet application system 250 in a transfer data step 1610. The data transferred in step 1610 includes data entered since the last data transfer between application user interface 255 and internet application system 250. The data may, therefore, include data entered into several data entry elements. In a step 1620, the data transferred in step 1610 is optionally processed by internet application system 250 in a manner analogous to step 1550 (FIG. 15). A next page is requested in an optional request page step 1560.

The "immediate" interaction model illustrated by FIG. 15 typically requires more frequent communication between application user interface 255 and internet application system 250 than does the "deferred" interaction model illustrated by FIG. 16. Consistent users may, therefore, prefer the deferred interaction model. However, the immediate interaction model allows more immediate recognition of errors in data entry than does the deferred interaction model. Casual users may, therefore, prefer the immediate interaction model.

One embodiment of the invention allows users to choose between these two interaction models. This choice includes customization (choice of model) by element, by type, by individual application user interface 255, by user, by application component, or by internet application.

Figure 17A:
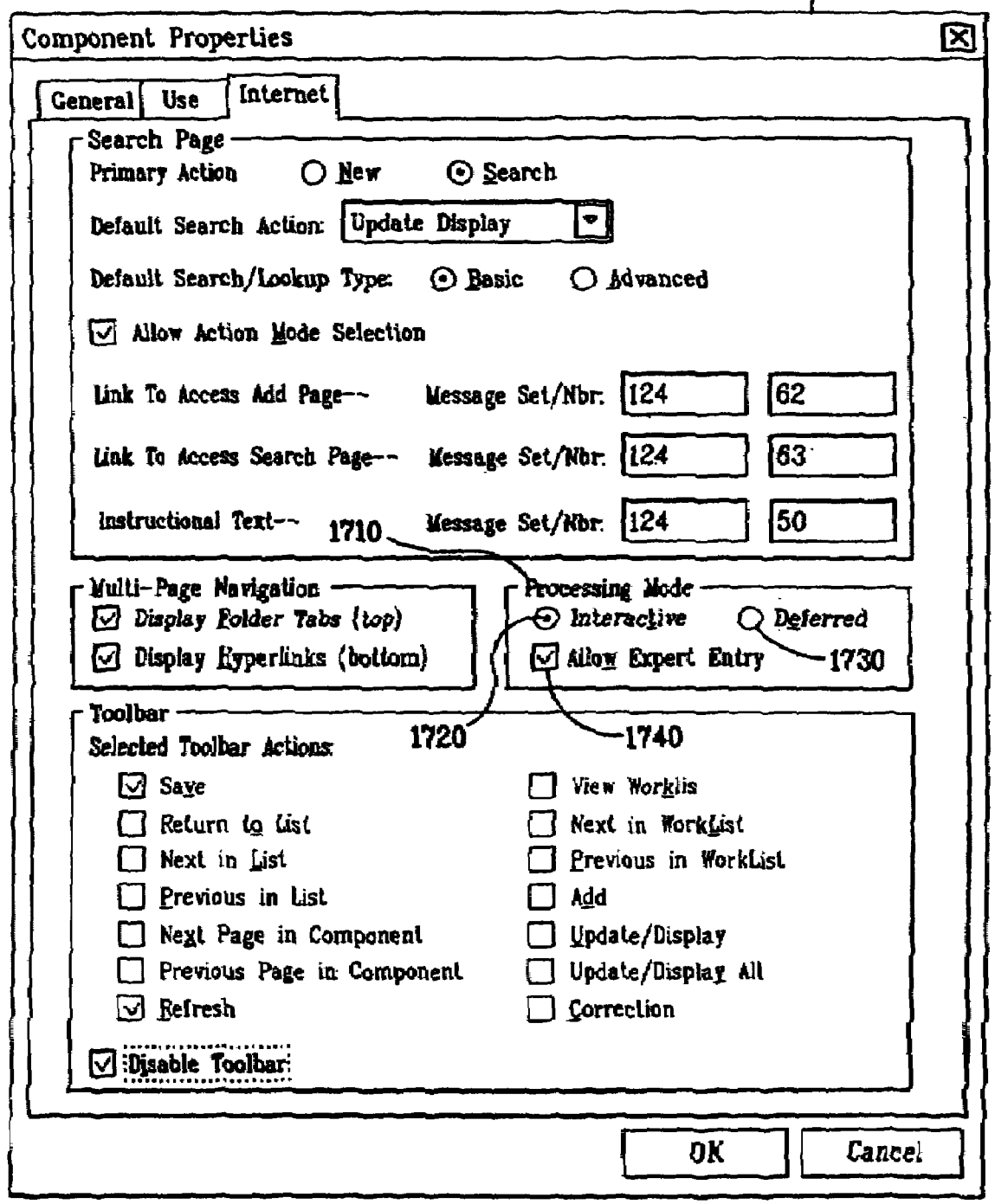
FIG. 17A illustrates an embodiment of a configuration interface arranged to allow customization of the interaction model used by an application component.

FIG. 17A illustrates an embodiment of configuration interface 275 arranged to allow customization of the interaction model used by an application component. A processing mode menu 1710 includes an interactive radio button 1720, a deferred radio button 1730, and an allow expert entry check box 1740. If the deferred radio button 1730 is selected, the deferred interaction model is used for the application component. Customization at the component level is subject to modification via further customization of more specific elements, such as individual application user interfaces 255 and user interface elements, within the component. If interactive radio button 1720 is selected the immediate interaction model is used for the component. When the interactive radio button 1720 is selected the allow expert entry checkbox is also available for checking or un-checking. If checked, then component interfaces of this application component will include an option that allows a user to change the interaction model while the internet application is running. An example of this option is illustrated in FIG. 17B.

Figure 17B:
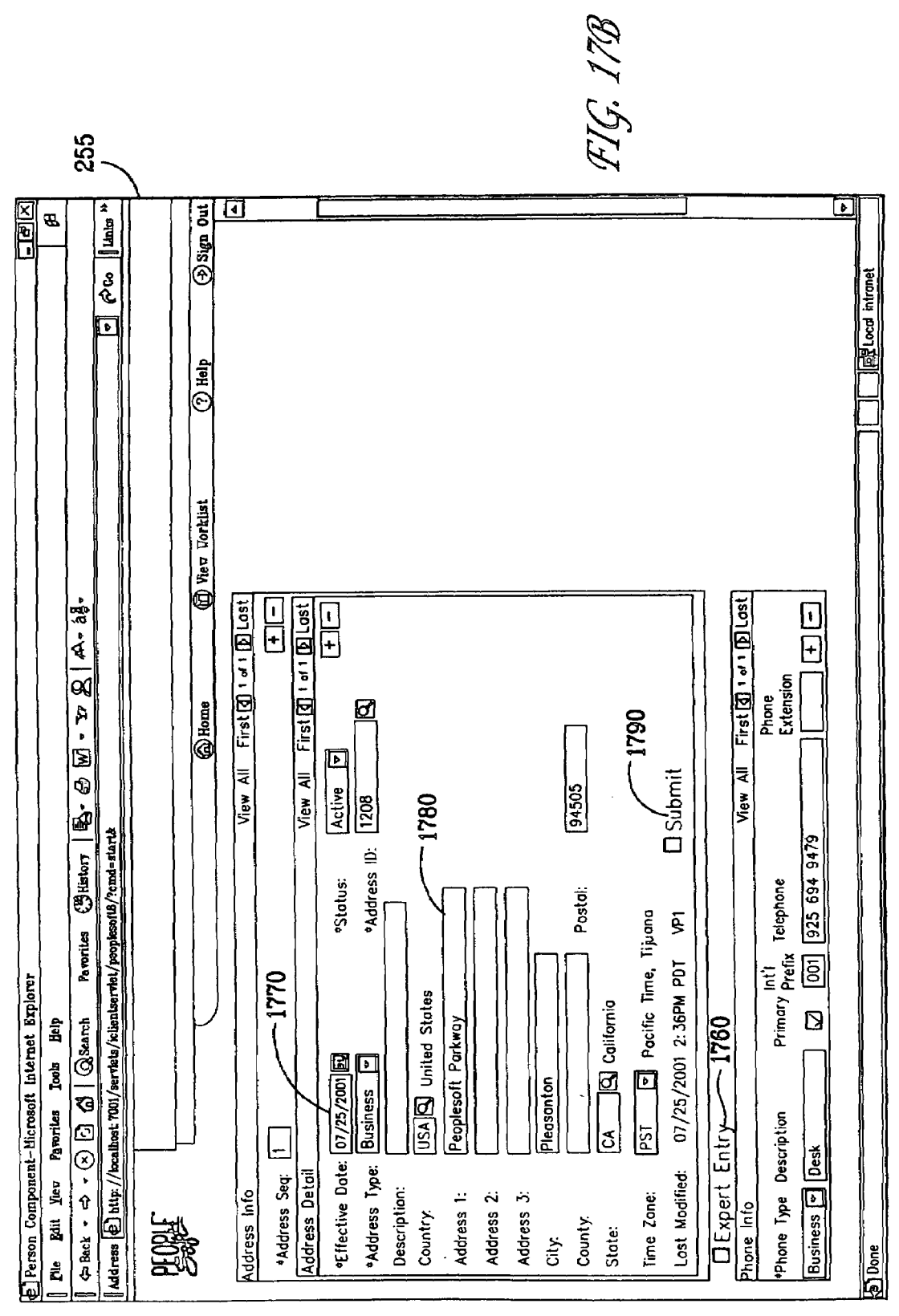

FIG. 17B illustrates an instance of application user interface 255 for entering address data. An expert entry checkbox 1760 allows users to change the interaction model from "Expert Entry" (immediate) to "Standard Entry" (deferred) during execution of the internet application. The expert entry checkbox is an embodiment of an interaction model control command. Checking the expert entry checkbox 1760, which has an effect similar to selecting the deferred radio button 1730 (FIG. 17A) in a page development step 100, configuration step 110, or personalization step 130, places application user interface 255 in the Expert Entry mode. For example, in the Expert Entry mode, entering an invalid date (such as a date in the future) in date entry field 1770 does not immediately result in an error message when the user moves the user interface focus to the text entry field 1780. The error message is not displayed because the business logic routine, designed to check for an invalid date, is not invoked until a submit checkbox 1790 is checked. In contrast, the Standard Entry mode is used if the expert entry checkbox 1760 is not checked and the interactive radio button 1720 (FIG. 17A) is not selected. In this mode an error message is immediately displayed when an improper date is entered in date entry field 1770 and focus is changed from date entry field 1770 to, for example, text entry field 1780.

The systems and methods of the present invention are used to customize other aspects of internet applications. For example, "Internationalization" includes alternative currencies, date formats, time calculations, and text language. Aspects of internationalization such as these are customized in methods similar to those used for configuration of other user interface elements. In another example, user interface elements are adjusted to conform to the Americans with Disabilities Act. These adjustments include increases in user interface element size, changes in text size, and optimized cursor placement that reduces the effort required for a user to navigate a user interface. They are also used to adjust application user interface 255 to be more amenable to screen reading software.

Embodiments of the present invention include customization of error messages, warnings, and confirmation messages. For example, a consistent user may prefer to see only critical error messages. In contrast a casual user may prefer to also see hints, warnings and confirmation messages. Configuration system 225 and personalization system 220 are used to select from among various message options that determine the types and importance of messages shown to a user. In one embodiment users can personalize their interaction with the internet application by selecting among several alternative "message levels." These levels include, for example, a "show all messages" option, a "show important messages" option, and a "show only critical messages" option. Referring again to FIG. 10B, an example is illustrated in which a user can select to see confirmation messages when saving data. If a save confirmation property 1060 is selected, the user will receive a confirmation when data has been saved.

The new approach to designing, implementing, and using user interfaces described herein introduces a new model for customization of internet applications. This customization is accomplished within an HTML/JavaScript environment and therefore is only dependent on a client having standard browser compatibility. The customization is independent of browser add-ons, such as plug-ins or downloaded Java applets or ActiveX controls, and also independent of the client-side environment, such as operating system, processing capabilities, or memory, that are beyond what is required to support the standard browser compatibility. The customization includes modification of user interface element functionality and is thus of significant benefit to consistent users. Various embodiments of the present invention include the use of customization in user interfaces used for communication between a user and an internet application.

Several embodiments are specifically illustrated and/or described herein. However, it will be appreciated that modifications and variations are covered by the above teachings and within the scope of the appended claims without departing from the spirit and intended scope thereof. For example, the various computer systems described herein may be implemented as distributed systems; likewise the location of specific data records is optionally varied among a variety of alternative locations. The use of "user interface" or "web page" to describe an HTML based interface is not meant to restrict the interface to distribution over the World Wide Web or any other specific network. Likewise, an "internet" application is not meant to restrict use of the present invention to applications using the Internet or World Wide Web. An internet application includes applications designed to execute over networks, such as intranets, extranets, wide area networks, or the like, that use communication protocols compatible with a standard browser. The "user" interacting with or using aspects of the present invention may be a person, or alternatively may be another computing system or program. Properties selected as being customizable, and later customized, may apply to any aspect of an internet application and are not restricted to those properties of individual user interface elements shown in the various figures. Customization of "Keystrokes" as described herein is optionally extended to include customization of mouse buttons, touch screens, or alternative data entry systems. Likewise, functionality such as tab-over need not be tied to a specific button, key or keystroke combination, such as the "Tab" key. Rather a customizable property may include a response to any user input device.

Microsoft Windows®, Microsoft FrontPage®, ActiveX®, Visual Basic® and Microsoft Internet Explorer® are registered trademarks of Microsoft Corporation. Java® and JavaScript® is a registered trademark of Sun Microsystems, Inc. Tuxedo is a registered trademark of BEA Systems, Inc. WebSphere is a registered trademark of International Business Machines, Corporation. PeopleCode and PeopleSoft are registered trademarks of PeopleSoft, Inc.

We claim:

1. A system for generating a customizable application user interface, comprising:
   an application development system configured to allow for the specification of a user interface element in the application user interface, the user interface element having a customizable immediate access keystroke combination associated therewith, the application development system being further confided to generate metadata characterizing the user customizable immediate access keystroke combination associated with the user interface element;
   a configuration system including a configuration engine and a configuration interface, the configuration interface configured to modify configuration data further characterizing the customizable immediate access keystroke combination in response to receiving input from a user defining the customizable immediate access keystroke combination, the keystroke combination for a function to be performed for the user interface element;
   a data repository including a data record for storing the configuration data, the data record being accessible using the metadata, the data record defining the function;
   an application user interface generator configured to generate the application user interface in response to a request from a client device, the user interface generator configured to use the data record to determine a current state of the user customizable immediate access keystroke combination at substantially the time of the request and generate markup language including the current state of the user customizable immediate access keystroke combination; and
   a web application server operable to deliver the generated markup language for the application user interface to the client device.

2. An application development system for developing an internet application having an application user interface, the application development system comprising:
   an integrated development environment configured for specifying a user interface element in the application user interface, the user interface element having a user customizable immediate access keystroke combination, the integrated development environment configured to receive input from a user defining the customizable immediate access keystroke combination, the keystroke combination for a function to be performed for the user interface element; and
   an application designer configured to produce metadata to characterize the customizable immediate access keystroke combination, the metadata defining the function, wherein, in response to a request from a user device, a current state of the customizable immediate access keystroke combination is operable to be determined using the metadata and used at substantially the time of the request to generate the application user interface to be sent to the user device, the application user interface including the current state of the customizable immediate access keystroke combination, and wherein the application user interface is configured to perform the function for the user interface element when the immediate access keystroke combination is received at the user device.

3. The application development system of claim 2, wherein the immediate access keystroke combination is a hotkey keystroke combination.

4. The application development system of claim 2, wherein the immediate access keystroke combination is responsive to the identity of a user.

5. A system for developing an application user interface associated with an internet application, comprising:

an integrated development environment configured for a developer to specify a user interface element in the application user interface, the user interface element having a user customizable immediate access keystroke combination, the integrated development environment configured to receive input from the developer defining the customizable immediate access keystroke combination, the keystroke combination for a function to be performed for the user interface element;

an application designer configured to produce metadata characterizing the user customizable immediate access keystroke combination;

a data repository including a data record associated with the customizable immediate access keystroke combination and accessible using the metadata, the data record being modifiable by a user of the application user interface and being configured to store data used to further characterize the customizable immediate access keystroke combination, the data record defining the function; and an application user interface generator configured to generate the application user interface in response to a request from the user, the user interface generator configured to use the data record to determine a current state of the user customizable immediate access keystroke combination at substantially the time of the request and generate markup language to be sent to the user in response to the request, the markup language including the current state of the user customizable immediate access keystroke combination, wherein the application user interface is automatically configured to perform the function for the user interface element when the immediate access keystroke combination is received.

6. The customizable application system of claim 5, wherein the user customizable immediate access keystroke combination is a hotkey keystroke combination.

7. The customizable application system of claim 5, wherein the user customizable immediate access keystroke combination is configurable according to the identity of a user.

8. The customizable application system of claim 5, wherein the data record is user modifiable using a configuration system.

9. The customizable application system of claim 5, wherein the data record is user modifiable using a personalization system.

10. The customizable application system of claim 9, wherein the personalization system is integrated into the internet application.

11. An application execution system, comprising:

a configuration system configured to modify a data record in response to receiving input from a user defining a customizable immediate access keystroke combination, the keystroke combination for a function to be performed for a user interface element an internet application system configured to support an internet application, the internet application system including a query processor configured to query a data repository, the data repository including the user-modifiable data record configured to store data characterizing a user customizable immediate access keystroke combination, the data record defining the function; and an application user interface generator configured to generate the application use interface in response to a request from a user, the application user interface generator configured to use the data record to determine a current state of the user customizable immediate access keystroke combination at substantially the time of the request and generate markup language including the current state of the user customizable immediate access keystroke combination, the application user interface configured as an interface between the internet application and the user and configured for delivery to a client over a computer network.

12. The application execution system of claim 11, wherein the client supports the application user interface using standard web browser protocols.

13. The application execution system of claim 11, wherein the client supports the application user interface using features of a web browser, the features not requiring a browser add-on, plug-in, or extension.

14. The application execution system of claim 11, further including a personalization system configured to modify the user modifiable data record.

15. The application execution system of claim 14, wherein the personalization system is included in the internet application.

16. An system for providing a user interface, comprising:

a configuration system configured to modify data characterizing a user customizable immediate access keystroke combination in response to receiving input from a user defining the customizable immediate access keystroke combination for a function to be performed for a user interface element;

a user interface generator configured to generate the user interface in response to a request from the user, the user interface generator configured to determine a current state of the customizable immediate access keystroke combination at substantially the time of the request and generate markup language including the current state of the customizable immediate access keystroke combination for the user interface element, the user interface being compatible with a standard web browser, the user interface element including the user customizable immediate access keystroke combination, wherein the user interface is configured to perform the function for the user interface element when the immediate access keystroke combination is received; and a web application server configured to deliver the generated markup language for the user interface to a client.

17. The internet application system of claim 16, wherein the user interface generator is further configured to use metadata to characterize the user customizable immediate access keystroke combination.

18. The internet application system of claim 16, wherein the user customizable immediate access keystroke combination is a hotkey keystroke combination.

19. The internet application system of claim 16, wherein the user interface generator is further configured to use a user modifiable data record to characterize the user customizable immediate access keystroke combination.

20. The internet application system of claim 16, further including means for accessing a user-modifiable data record including data characterizing the user customizable immediate access keystroke combination.

21. The internet application system of claim 16, wherein the internet application includes a configuration system configured to modify data characterizing the user customizable immediate access keystroke combination.

22. The internet application system of claim 16, wherein the client is a wireless system.

23. The internet application system of claim 16, wherein the client is a programmable device configured to support standard web browser protocols.

24. A method of developing a customizable user interface element for inclusion in an application user interface, the method comprising the steps of:
   determining a user interface element to be included in the application user interface;
   specifying a customizable property of the user interface element, the customizable property including a user customizable immediate access keystroke combination;
   determining a data record for holding a value configured to characterize the user customizable immediate access keystroke combination, the data record being stored in a data repository and being user modifiable, the data repository being physically remote from a client used to display the application user interface, the application user interface being for accessing an internet application;
   generating metadata further characterizing the user customizable immediate access keystroke combination, the metadata including a reference to the data record;
   storing the metadata in association with the user interface element;
   receiving input from a user defining the customizable immediate access keystroke combination for a function to be performed for the user interface element; and
   configuring the value of the data record to define the function,
   wherein, in response from a request from the client, the value of the data record is operable to be used to determine a current state of the customizable immediate access keystroke combination at substantially the time of the request the current state operable to be used to generate markup language for the application user interface including the current state of the customizable immediate access keystroke combination, the application user interface operable to be sent to the client and configured to perform the function for the user interface element when the immediate access keystroke combination is received at the client.

25. The method of claim 24, wherein the user customizable immediate access keystroke combination is a hotkey keystroke combination.

26. The method of claim 25, wherein the step of specifying a customizable property is performed using an integrated development environment.

27. The method of claim 25, wherein the internet application includes a configuration system configured to modify the data record.

28. A method of generating a customizable application user interface, the method comprising the steps of:
   accessing a page definition in response to a request from a client, the page definition including metadata for characterizing a user customizable immediate access keystroke combination;
   accessing a data record using the metadata, the data record being stored in a data repository and being user modifiable in response to receiving input from a user defining the customizable immediate access keystroke combination for a function to be performed for the user interface element, the data record defining the function, the data repository being physically remote from the client used to display the user customizable application user interface;
   determining a current state of the user customizable immediate access keystroke combination at substantially the time of the request using information stored in the data record;
   generating markup language responsive to the determined value, the markup language including the current state of the customizable immediate access keystroke combination; and
   sending the generated markup language to the client to display the application user interface, the application user interface configured to perform the function for the user interface element when the immediate access keystroke combination is received.

29. The method of claim 28, wherein the customizable application user interface is a user interface to an internet application.

30. The method of claim 29, further including a step of modifying the data record using a configuration system.

31. The method of claim 29, wherein the step of accessing a data record using the metadata is responsive to the identity of a user.

32. The method of claim 29, wherein the user customizable immediate access keystroke combination is a hotkey keystroke combination.

33. A method of developing an HTML based interface between a user and an application, the method comprising the steps of:
   receiving a selection of a user interface element from a user in response defining a customizable immediate access keystroke combination, the keystroke combination for a function to be performed for the user interface element;
   associating the user interface element with a data record, the data record being stored in a data repository and being user modifiable, the data record defining the function;
   generating metadata characterizing the user customizable immediate access keystroke combination, the metadata being for accessing the data record; and
   storing the metadata in association with the application,
   wherein the data record is operable to be used, in response to a request from a client, to determine a current state of the customizable immediate access keystroke combination at substantially the time of the request, the current state operable to be used to generate markup language for the application user interface including the current state of the customizable immediate access keystroke combination, the generated markup language operable to be sent to the client for display to a user.

34. The method of claim 33, wherein the application is an internet application.

35. The method of claim 34, wherein the metadata is configured to access the data record responsive to an identity of a user of the application.

36. The method of claim 34, wherein the customizable immediate access keystroke combination is a hotkey keystroke combination.

37. A method of customizing an immediate access keystroke combination in an HTML based application user interface for accessing an internet application, the method comprising the steps of:
   accessing a configuration system, the configuration system including a configuration engine and a configuration interface;
   selecting, using the configuration interface, the immediate access keystroke combination of a user interface element in the HTML based application user interface, the immediate access keystroke combination being user customizable, the keystroke combination for a function to be performed for the user interface element; and
   specifying configuration data using the configuration interface, the configuration data characterizing the immediate access keystroke combination and the configuration data being stored in a data repository physically remote from a client used to display the HTML based application user interface, the configuration data defining the function,
   wherein, in response to a request from a client, the configuration data is operable to be used to determine a current state of the customizable immediate access keystroke combination at substantially the time of the request, the current state operable to be used to generate HTML for the application user interface including the current state, the generated HTML operable to be transmitted to the client for displaying the application user interface, the application user interface configured to perform the function for the user interface element when the immediate access keystroke combination is received.

38. The method of claim 37, wherein the immediate access keystroke combination is a hotkey keystroke combination.

39. The method of claim 37, wherein configuration data is configured to characterize the immediate access keystroke combination responsive to an identity of a user of the internet application.

40. The method of claim 37, further including a step of modifying the configuration data using a personalization system.

41. The method of claim 37, wherein the HTML based application user interface is displayed at the client without requiring a browser add-on, plug-in, or extension.

42. A method of customizing an immediate access keystroke combination in an application user interface, the method comprising the steps of:
   accessing a configuration system, the configuration system including a configuration engine and a configuration interface;
   selecting, using the configuration interface, an immediate access keystroke combination of a user interface element in an application user interface, the immediate access keystroke combination being user customizable, the keystroke combination for a function to be performed for the user interface element;
   specifying configuration data using the configuration interface, the configuration data characterizing the immediate access keystroke combination, the configuration data defining the function;
   sending a request for the application user interface, in response to which a current state of the immediate access keystroke combination is determined at substantially the time of the request, the current state being used to generate markup language for the application user interface including the current state; and
   receiving the generated markup language and displaying the application user interface, the application user interface being associated with an internet application and configured to perform the function for the user interface element when the immediate access keystroke combination is received.

43. The method of claim 42, further including a step of displaying the application user interface using standard web browser protocols.

44. The method of claim 42, wherein the immediate access keystroke combination is a hotkey keystroke combination.

45. A method of executing an internet application comprising the steps of:
   receiving a request for an application user interface from a client, the application user interface including a user interface element;
   accessing a page definition, the page definition including metadata characterizing the requested application user interface;
   retrieving, using the metadata, a value characterizing a user customizable immediate access keystroke combination of the user interface element, the value being stored in a data repository physically remote from the client, the value defining a function for the customizable immediate access keystroke combination, the keystroke combination for the function to be performed for the user interface element being received from a user;
   automatically generating HTML responsive to the retrieved value;
   including the generated HTML in the requested application user interface; and
   delivering the requested user interface to the client, the requested application user interface being an interface between a user and the internet application, wherein the application user interface is configured to perform the function for the user interface element when the immediate access keystroke combination is received.

46. The method of claim 45, wherein the user customizable immediate access keystroke combination is a hotkey keystroke combination.

47. The method of claim 45, wherein the retrieved value is personalization data.

48. The method of claim 45, further including a step of displaying the application user interface on the client using standard web browser protocols.

49. The method of claim 45, further including the step of identifying the requester, wherein the step of retrieving a value is responsive to the identity of the requester.

50. The method of claim 45, wherein the step of retrieving a value is responsive to inclusion of the application user interface in an application component.

51. A method of generating an application user interface including a user customizable immediate access keystroke combination, the method comprising the steps of:
   accessing a page definition in response to a request from a client device, the page definition including metadata associated with the user customizable immediate access keystroke combination;

reading data from a data record using the metadata, the data record being stored in a data repository and being user modifiable, the data repository being physically remote from the client device used to display the application user interface, the data record defining a function for the customizable immediate access keystroke combination, the keystroke combination for the function to be performed for the user interface element being received from a user;

determining a value characterizing the user customizable immediate access keystroke combination using the data read from the data record;

automatically generating HTML for the application user interface responsive to the determined value at substantially the time of the request; and transmitting the generated HTML for the application user interface to the client device, the application user interface being for accessing an internet application, wherein the application user interface is configured to perform the function for the user interface element when the immediate access keystroke combination is received.

52. The method of claim 51, wherein the user customizable immediate access keystroke combination is a hotkey keystroke combination.

53. The method of claim 51, wherein the data record includes personalization data.

54. The method of claim 51, further comprising:
delivering the application user interface to the client; and
displaying the application user interface at the client using standard web browser protocols.

55. The method of claim 51, further including identifying the client, wherein the step of reading data is responsive to the identity of the client.

56. The method of claim 51, further including a step of identifying a user, wherein the step of reading data is responsive to the identity of the user.

57. A method of generating a user customizable application user interface configured for delivery from a server to a client, the method comprising the steps of:

receiving a request for the user customizable application user interface from a requestor, the user customizable application user interface including a user interface element;

identifying the requestor of the user customizable application user interface;

accessing a page definition, the page definition including metadata characterizing the requested user customizable application user interface;

retrieving a value characterizing a customizable immediate access keystroke combination included in the user interface element, using the metadata and the identity of the requestor, the value being user modifiable and being stored in a data repository physically remote from the client, the value defining a function for the customizable immediate access keystroke combination, the keystroke combination for the function to be performed for the user interface element being received from a user;

automatically generating HTML for the customizable application user interface responsive to the value at substantially the time of the request; and delivering the generated markup language for the requested user customizable application user interface to the client, wherein the application user interface is configured to perform the function for the user interface element when the immediate access keystroke combination is received.

58. The method of claim 57, wherein the customizable immediate access keystroke combination is a customizable hotkey keystroke combination.

59. The method of claim 57, further including displaying the user customizable application user interface using standard web browser protocols.

60. A computer readable medium including an internet application, the internet application comprising:

a user interface generator configured to generate the application user interface in response to a request from a client, the user interface generator configured to access a user modifiable data record stored in a location physically remote from the client, the user modifiable data record configurable to characterize a user customizable immediate access keystroke combination associated with a user interface element of an application user interface and having a function, the data record defining the function, the user interface generator further configured to determine a current state of the user customizable immediate access keystroke combination at substantially the time of the request and generate markup for the application user interface in response thereto, the generated markup language including the current state and operable to be transmitted to the client in order to display the application user interface including the current state; and a configuration system configured for a user to modify the user modifiable data record in response to receiving input from the user defining the customizable immediate access keystroke combination, the keystroke combination for a function to be performed for the user interface element, the data record being modified based on the input.

61. A computer program product embedded in a computer readable medium for generating an application user interface, comprising:

computer program code for developing an application user interface, the application user interface including a user interface element with a user customizable immediate access keystroke combination, the application user interface configured for delivery to a client and configured to operate as an interface between a user and the internet application;

computer program code for determining, in response to a request from a client, a current state of the user customizable immediate access keystroke combination at substantially the time of the request using a user modifiable data record stored in a location physically remote from the client the user modifiable data record configurable to characterize the user customizable immediate access keystroke combination, the data record defining the function;

computer program code for generating markup language for the application user interface including the current state of the user customizable immediate access keystroke combination, the generated markup language operable to be sent to the client to display the application user interface, the application user interface configured to perform the function for the user interface element when the immediate access keystroke combination is received; and computer program code for allowing a user to modify the user modifiable data record in response to receiving input from the user defining the customizable immediate access keystroke combination, the keystroke combination for a function to be performed for the user interface element, the data record being modified based on the input.

62. An application execution system comprising:

means for supporting an internet application;

means for using a user modifiable data record to store data characterizing a user customizable immediate access keystroke combination, the data defining the function;

means for generating markup language for an application user interface, in response to a request from a client, the user modifiable data record being used to determine a current state of the user customizable immediate access keystroke combination at substantially the time of the request, the makeup language including the current state, wherein the application user interface is configured to perform the function for the user interface element when the immediate access keystroke combination is received, the keystroke combination for the function to be performed for the user interface element being received from a user; and means for providing the generated markup language for the application user interface to the client, the application user interface including a user interface element, the application user interface configured as an interface between the internet application and the user, the user interface element including the user customizable immediate access keystroke combination.

* * * * *

UNITED STATES PATENT AND TRADEMARK OFFICE
CERTIFICATE OF CORRECTION

PATENT NO.         : 7,263,662 B1
APPLICATION NO. : 10/035413
DATED              : August 28, 2007
INVENTOR(S)        : Alan Ballard et al.

It is certified that error appears in the above-identified patent and that said Letters Patent is hereby corrected as shown below:

Page 2, On the title page item (56), under "Other Publications," column 2, reference 17, replace "/Is/" with -- /ts/ --.

Page 2, On the title page item (56), under "Other Publications," column 2, reference 20, replace "/overinl.htm" with --/overint.htm --.

In column 30, line 24, replace "confided" with -- configured --.

In column 33, line 54, after "request" insert -- , --.

In column 36, line 56, replace "requester" with -- requestor --.

In column 39, line 15, replace "makeup" with -- markup --.

Signed and Sealed this

Fourth Day of December, 2007

JON W. DUDAS
*Director of the United States Patent and Trademark Office*